United States Patent
McCue et al.

(12)

(10) Patent No.: US 10,735,488 B2
(45) Date of Patent: Aug. 4, 2020

(54) METHOD OF DOWNLOADING DIGITAL CONTENT TO BE RENDERED

(71) Applicant: Audio Pod Inc., Ottawa, Ontario (CA)

(72) Inventors: John McCue, Ottawa (CA); Robert McCue, Ottawa (CA); Gregory Shostakovsky, Kanata (CA); Glenn McCue, Ottawa (CA)

(73) Assignee: Audio Pod Inc., Ottawa, Ontario (CA)

( * ) Notice: Subject to any disclaimer, the term of this patent is extended or adjusted under 35 U.S.C. 154(b) by 0 days.

(21) Appl. No.: 16/145,265

(22) Filed: Sep. 28, 2018

(65) Prior Publication Data

US 2019/0044993 A1    Feb. 7, 2019

Related U.S. Application Data

(60) Continuation of application No. 15/358,354, filed on Nov. 22, 2016, now Pat. No. 10,091,266, which is a
(Continued)

(51) Int. Cl.
*G06F 15/16* (2006.01)
*H04L 29/06* (2006.01)
*G10L 25/78* (2013.01)

(52) U.S. Cl.
CPC ............ *H04L 65/607* (2013.01); *G10L 25/78* (2013.01); *H04L 29/06027* (2013.01);
(Continued)

(58) Field of Classification Search
USPC ......................................................... 709/219
See application file for complete search history.

(56) References Cited

U.S. PATENT DOCUMENTS 5,533,182 A * 7/1996 Bates .................. G06F 3/04812
715/727
5,586,264 A   12/1996 Belknap et al. ......... 395/200.08
(Continued)

FOREIGN PATENT DOCUMENTS

| EP | 1463258 A1 | 9/2004 | ............. H04L 29/06 |
| WO | 01/58165 A2 | 8/2001 | ............... H04N 7/24 |

(Continued)

OTHER PUBLICATIONS

EP search report from related EP application No. EP06840473.
(Continued)

*Primary Examiner* — Alicia Baturay
(74) *Attorney, Agent, or Firm* — Teitelbaum & Bouevitch; Neil Teitelbaum

(57) ABSTRACT

A method of downloading digital content to be rendered is provided in which a list of content servers that are capable of serving requested digital content is downloaded from a network accessible server. Service level statistics are tracked for the content servers in the list of content servers. A first content server to serve the requested digital content is selected from the list of content servers in dependence upon the service level statistics. A first segment of the requested digital content is downloaded from the first content server for rendering. In the event of a degradation in service, a second content server to replace the first content server is selected from the list of content servers in dependence upon the service level statistics, wherein the server replacement is substantially imperceptible. A second segment of the requested digital content is downloaded from the second content server for rendering.

18 Claims, 15 Drawing Sheets

Related U.S. Application Data continuation of application No. 15/054,756, filed on Feb. 26, 2016, now Pat. No. 9,954,922, which is a continuation of application No. 14/924,028, filed on Oct. 27, 2015, now Pat. No. 9,930,089, which is a division of application No. 14/250,591, filed on Apr. 11, 2014, now Pat. No. 9,203,884, which is a continuation of application No. 13/588,084, filed on Aug. 17, 2012, now Pat. No. 8,738,740, which is a continuation of application No. 12/096,933, filed as application No. PCT/CA2006/002046 on Dec. 12, 2006, now Pat. No. 8,285,809.

(60) Provisional application No. 60/749,632, filed on Dec. 13, 2005.

(52) U.S. Cl.
CPC ...... H04L 65/4069 (2013.01); H04L 65/4092 (2013.01); H04L 65/60 (2013.01); H04L 65/602 (2013.01); H04L 65/608 (2013.01); H04L 67/42 (2013.01)

(56) References Cited

U.S. PATENT DOCUMENTS

| | | | | |
|---|---|---|---|---|
| 5,724,475 | A * | 3/1998 | Kirsten | G08B 13/19645 348/E7.086 |
| 6,108,637 | A * | 8/2000 | Blumenau | H04L 43/08 715/204 |
| 6,452,609 | B1 * | 9/2002 | Katinsky | H04L 67/02 715/716 |
| 6,542,869 | B1 * | 4/2003 | Foote | G10H 1/00 704/500 |
| 6,621,980 | B1 | 9/2003 | Gould et al. | 386/69 |
| 6,697,564 | B1 * | 2/2004 | Toklu | H04N 21/4394 386/285 |
| 6,728,748 | B1 * | 4/2004 | Mangipudi | H04L 41/5009 709/226 |
| 6,810,409 | B1 * | 10/2004 | Fry | H04L 29/06 709/202 |
| 6,816,834 | B2 * | 11/2004 | Jaroker | G10L 15/26 704/235 |
| 6,816,909 | B1 * | 11/2004 | Chang | H04L 65/604 709/217 |
| 6,850,982 | B1 * | 2/2005 | Siegel | H04L 67/1002 709/203 |
| 6,868,225 | B1 * | 3/2005 | Brown | G11B 27/28 386/239 |
| 6,961,751 | B1 * | 11/2005 | Bates | G06F 16/9562 709/203 |
| 6,988,169 | B2 * | 1/2006 | Burger | G06F 12/0862 711/137 |
| 7,143,353 | B2 * | 11/2006 | McGee | G11B 27/105 715/723 |
| 7,242,809 | B2 * | 7/2007 | Hunter | G06K 9/00711 375/240.16 |
| 7,248,777 | B2 * | 7/2007 | Feininger | H04N 5/76 386/241 |
| 7,293,094 | B2 * | 11/2007 | Vaman | H04L 47/10 370/353 |
| 7,379,875 | B2 * | 5/2008 | Burges | G06K 9/00523 704/273 |
| 7,386,473 | B2 * | 6/2008 | Blumenau | G06Q 30/0633 705/14.54 |
| 7,394,817 | B2 * | 7/2008 | Yap | H04L 67/1059 370/400 |
| 7,421,411 | B2 * | 9/2008 | Kontio | G06F 21/10 705/52 |
| 7,466,898 | B2 * | 12/2008 | Ohashi | H04N 7/163 386/241 |
| 7,519,717 | B2 * | 4/2009 | Stanford-Clark | H04L 29/06027 709/227 |
| 7,539,086 | B2 * | 5/2009 | Jaroker | G06Q 50/18 369/25.01 |
| 7,546,118 | B2 * | 6/2009 | Camp, Jr. | H04L 29/06027 455/418 |
| 7,610,394 | B2 * | 10/2009 | Katinsky | H04L 67/02 709/231 |
| 7,624,337 | B2 * | 11/2009 | Sull | G06T 3/4092 715/201 |
| 7,631,098 | B2 * | 12/2009 | Boutboul | H04L 67/10 709/238 |
| 7,680,849 | B2 * | 3/2010 | Heller | G06F 16/258 707/621 |
| 7,686,215 | B2 * | 3/2010 | Jones | H04L 67/06 235/380 |
| 7,721,301 | B2 | 5/2010 | Wong et al. | 719/322 |
| 7,730,407 | B2 * | 6/2010 | Chiu | G11B 27/105 715/732 |
| 7,769,822 | B2 * | 8/2010 | Achtermann | G06F 16/951 709/218 |
| 7,788,671 | B2 * | 8/2010 | Black-Ziegelbein | G06F 9/5061 709/220 |
| 7,797,446 | B2 * | 9/2010 | Heller | G11B 27/002 707/E17.109 |
| 7,852,748 | B2 * | 12/2010 | Le Faucheur | H04L 45/22 370/217 |
| 7,882,140 | B1 * | 2/2011 | DiLorenzo | G06Q 30/02 707/802 |
| 7,899,915 | B2 * | 3/2011 | Reisman | G06F 16/954 709/228 |
| 7,958,441 | B2 * | 6/2011 | Heller | G11B 27/105 715/201 |
| 7,966,577 | B2 * | 6/2011 | Chaudhri | G06F 3/0482 715/835 |
| 7,984,147 | B2 * | 7/2011 | Daoud | H04L 47/2425 709/226 |
| 7,987,491 | B2 * | 7/2011 | Reisman | G06F 16/954 725/112 |
| 7,996,550 | B2 * | 8/2011 | Fischer | H04L 67/104 370/230 |
| 8,009,961 | B2 * | 8/2011 | Watanabe | G11B 27/34 386/243 |
| 8,191,103 | B2 * | 5/2012 | Hofrichter | G11B 27/034 725/142 |
| 8,225,194 | B2 * | 7/2012 | Rechsteiner | G11B 27/034 707/805 |
| 8,285,809 | B2 * | 10/2012 | McCue | G10L 25/78 709/217 |
| 8,363,084 | B2 * | 1/2013 | Cockerton | G11B 27/034 348/14.01 |
| 8,370,888 | B2 * | 2/2013 | Zimmermann | H04N 21/2187 709/226 |
| 8,392,528 | B2 * | 3/2013 | Kreitzer | H04L 29/06027 709/217 |
| 8,515,773 | B2 * | 8/2013 | Hofrichter | G06Q 30/0601 705/1.1 |
| 8,738,740 | B2 * | 5/2014 | McCue | G10L 25/78 709/219 |
| 9,203,884 | B2 * | 12/2015 | McCue | G10L 25/78 |
| 9,319,720 | B2 * | 4/2016 | McCue | H04N 21/235 |
| 9,412,417 | B2 * | 8/2016 | Jobs | G11B 27/031 |
| 9,596,170 | B2 * | 3/2017 | Johns | H04L 45/22 |
| 9,729,907 | B2 * | 8/2017 | McCue | H04N 21/235 |
| 9,930,089 | B2 * | 3/2018 | McCue | G10L 25/78 |
| 9,954,922 | B2 * | 4/2018 | McCue | G10L 25/78 |
| 10,091,266 | B2 * | 10/2018 | McCue | G10L 25/78 |
| 10,097,451 | B2 * | 10/2018 | Johns | H04L 45/22 |
| 10,237,595 | B2 * | 3/2019 | McCue | H04N 21/235 |
| 2002/0065922 | A1 * | 5/2002 | Shastri | H04L 65/80 709/227 |
| 2002/0069218 | A1 | 6/2002 | Sull et al. | 715/202 |
| 2002/0087694 | A1 | 7/2002 | Daoud et al. | 709/226 |

(56) References Cited

U.S. PATENT DOCUMENTS

| | | | |
|---|---|---|---|
| 2002/0129162 A1* | 9/2002 | McGregor | H04L 67/306 709/238 |
| 2002/0184189 A1 | 12/2002 | Hay et al. | 707/1 |
| 2003/0046348 A1* | 3/2003 | Pinto | G06Q 10/107 709/206 |
| 2003/0046384 A1* | 3/2003 | Sirivara | H04L 41/5006 709/224 |
| 2003/0079222 A1* | 4/2003 | Boykin | H04N 21/235 725/31 |
| 2003/0091338 A1 | 5/2003 | Snow et al. | 386/96 |
| 2003/0167262 A1 | 9/2003 | Iida et al. | |
| 2003/0172346 A1 | 9/2003 | Gould et al. | 715/501.1 |
| 2003/0221194 A1* | 11/2003 | Thiagarajan | H04N 5/76 725/55 |
| 2004/0169683 A1* | 9/2004 | Chiu | G06F 16/40 715/776 |
| 2004/0172365 A1* | 9/2004 | Murakami | G06Q 30/04 705/52 |
| 2004/0249768 A1* | 12/2004 | Kontio | G06Q 20/3674 705/65 |
| 2005/0061873 A1 | 3/2005 | Pirillo | 235/380 |
| 2005/0091062 A1 | 4/2005 | Burges et al. | 704/273 |
| 2005/0111824 A1 | 5/2005 | Hunter et al. | 386/52 |
| 2005/0144305 A1* | 6/2005 | Fegan, II | H04L 65/602 709/231 |
| 2005/0171763 A1* | 8/2005 | Zhou | G11B 20/10527 704/201 |
| 2005/0177618 A1* | 8/2005 | Zimler | H04N 21/8549 709/203 |
| 2005/0245243 A1* | 11/2005 | Zuniga | H04N 21/26208 455/414.3 |
| 2005/0250439 A1* | 11/2005 | Leslie | H04W 4/06 455/11.1 |
| 2005/0276570 A1 | 12/2005 | Reed, Jr. et al. | 386/46 |
| 2006/0015914 A1* | 1/2006 | Lee | H04N 5/76 725/101 |
| 2006/0140162 A1 | 6/2006 | Vasa | H04L 51/38 370/338 |
| 2006/0236219 A1 | 10/2006 | Grigorovitch et al. | 715/500.1 |
| 2006/0242550 A1 | 10/2006 | Rahman et al. | 715/500.1 |
| 2006/0265409 A1* | 11/2006 | Neumann | G06F 16/44 |
| 2006/0265637 A1* | 11/2006 | Marriott | G06F 16/9535 715/210 |
| 2006/0271989 A1 | 11/2006 | Glaser et al. | 725/111 |
| 2007/0016636 A1* | 1/2007 | Boerries | G06Q 10/107 709/200 |
| 2007/0041356 A1* | 2/2007 | Fontijn | G11B 27/329 370/352 |
| 2007/0067267 A1 | 3/2007 | Ives | |
| 2007/0083354 A1 | 4/2007 | Collins et al. | 703/23 |
| 2007/0083911 A1* | 4/2007 | Madden | H04N 5/85 725/135 |
| 2007/0094691 A1* | 4/2007 | Gazdzinski | H04N 21/4126 725/62 |
| 2007/0100833 A1* | 5/2007 | Chen | G06F 16/9562 |
| 2007/0106675 A1* | 5/2007 | Watanabe | G11B 27/34 |
| 2007/0112837 A1 | 5/2007 | Houh et al. | 707/102 |
| 2007/0118657 A1* | 5/2007 | Kreitzer | G06F 16/48 709/227 |
| 2007/0124331 A1* | 5/2007 | Griffin | G11B 27/322 |
| 2009/0171750 A1 | 7/2009 | Zhou et al. | 705/14.53 |
| 2009/0177996 A1 | 7/2009 | Hunt et al. | 715/788 |
| 2010/0174717 A1* | 7/2010 | Fambon | G06F 9/548 707/741 |
| 2010/0281509 A1 | 11/2010 | Yu et al. | 725/100 |
| 2011/0118858 A1 | 5/2011 | Rottler et al. | 700/94 |

FOREIGN PATENT DOCUMENTS

| | | | | |
|---|---|---|---|---|
| WO | 02/08948 A2 | 1/2002 | | G06F 17/00 |
| WO | 02/080524 A2 | 10/2002 | | H04N 5/00 |

OTHER PUBLICATIONS

Delacourt P. et al, "A speaker-based segmentation for audio data indexing", Speech Communication, Elsevier Science Publishers, Amsterdam, NL, vol. 32, No. 1-2, pp. 111-126, Sep. 1, 2000.

"SpeechSkimmer: A System for Interactively Skimming Recorded Speech" by Barry Arons, MIT Media Lab, ACM Transactions on Computer-Human Interaction, vol. 4, No. 1, Mar. 1997, pp. 3-38.

Epub Media Overlays 3.0, International Digital Publishing Forum, (http://idpf.org/epub/30/spec/epub30-mediaoverlays-20110516.html), May 16, 2011.

* cited by examiner

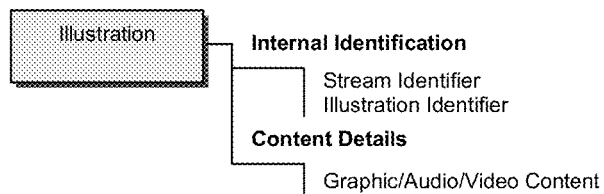
Internal Identification
- Stream Identifier
- Illustration Identifier

Content Details
- Graphic/Audio/Video Content

Fig. 5d

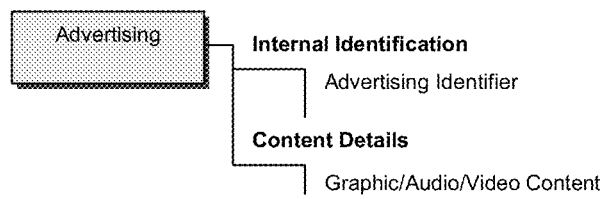
Internal Identification
- Advertising Identifier

Content Details
- Graphic/Audio/Video Content

Fig. 5e

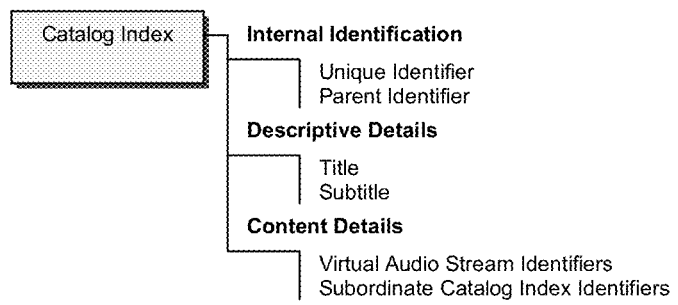
Internal Identification
- Unique Identifier
- Parent Identifier

Descriptive Details
- Title
- Subtitle

Content Details
- Virtual Audio Stream Identifiers
- Subordinate Catalog Index Identifiers

Fig. 5f

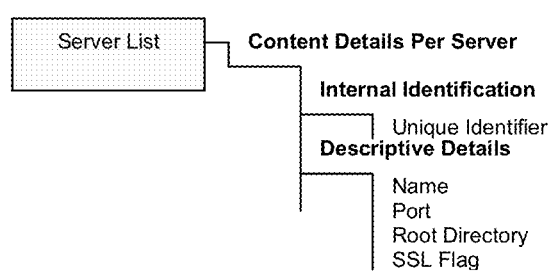
Content Details Per Server

Internal Identification
- Unique Identifier

Descriptive Details
- Name
- Port
- Root Directory
- SSL Flag

Fig. 5g

METHOD OF DOWNLOADING DIGITAL CONTENT TO BE RENDERED

CROSS REFERENCE TO RELATED APPLICATIONS

This application is a continuation of U.S. patent application Ser. No. 15/358,354, filed on Nov. 22, 2016, which is a continuation of U.S. patent application Ser. No. 15/054,756 filed on Feb. 26, 2016, which is a continuation of U.S. patent application Ser. No. 14/924,028 filed on Oct. 27, 2015, which is a divisional of U.S. patent application Ser. No. 14/250,591 filed on Apr. 11, 2014, which is a continuation of U.S. patent application Ser. No. 13/588,084 filed on Aug. 17, 2012, which is a continuation of U.S. patent application Ser. No. 12/096,933 filed on Jun. 11, 2008, which was the National Stage Entry of International Application No. PCT/CA2006/002046 filed on Dec. 12, 2006, which claims priority from U.S. Provisional Appln. No. 60/749,632 filed on Dec. 13, 2005, all of which are hereby incorporated by reference in their entireties.

TECHNICAL FIELD

The present application relates generally to the memory management of digital audio data, and in particular, to memory management of an open media stream stored on an electronic device.

BACKGROUND OF THE INVENTION

Traditionally, there have been two different approaches for delivering digital audio data. In the first approach, the digital audio data is mass downloaded. More specifically, and as shown schematically in FIG. 1, one or more files corresponding to an entire audio stream 10 is transmitted one frame 12 at a time from the server to the client. Once the entire audio stream 10 has been received and reassembled to form a continuous, contiguous audio stream, it is stored in storage 14 prior to being transmitted to a media player 16.

In the second approach, streaming technology is used to deliver the digital audio data 'just-in-time'. More specifically, and as shown schematically in FIG. 2, an entire audio stream 20 is transmitted one frame 22 at a time from the server to the client, where it is received and reassembled, in part, to provide a continuous, contiguous audio stream (i.e., a small portion of audio stream continuity is preserved). Once each frame is played by the media player 26, it is then discarded from the buffer.

Small audio streams, or audio-video streams, which for example correspond to individual songs, very short movies, and music videos, are typically transmitted using the first approach. In terms of the delivery of these smaller streams of media, the delays experienced by the users are generally tolerated because they are relatively short in nature. Typically, time delays are measured as one or two minutes, and although possible, tend not to exceed this.

The delivery of larger audio streams, which for example include books and radio shows, presents a problem for the user community. Whereas a single song that plays for 4 minutes may take 1 minute to download, an audio book that plays for 12 hours may take 3 to 4 hours to download. Although the general performance is relatively the same in terms of throughput rate, users of this media complain about the hours of waiting to receive and use the media selected.

While streaming technology obviates the waiting associated with mass download, any degradation experienced in the delivery of the content in real time introduces interruptions in the audio stream, causing breaks and interruptions in the users experience of that audio stream. Moreover, since the digital audio data is not stored, repositioning within the audio stream (e.g., using rewind or fast forward functions) interrupts the just-in-time nature of content delivery, and thus, may introduce significant delays and/or be inefficient. For example, in the case of rewinding a streamed audio stream, the content associated with the new position selected in the audio stream will need to be downloaded a second time and the future content temporarily stored in the buffer will be discarded.

In both of the existing technologies, great effort is made to reassemble the audio stream into a continuous, contiguous audio stream prior to being presented to the media player. In the case of the mass download approach, the entire audio stream is downloaded and reassembled prior to use. In streaming technologies, a very small portion of the audio stream is downloaded and reassembled prior to use with additional content delivered and already played content discarded continuously, to maintain a very small portion of continuity in the audio stream. Notably, this reconstruction of the audio stream complicates the digital audio data delivery and increases delivery time.

In addition, in both of the existing technologies, the user has limited tracking options. For example, 'The Godfather' is an audio book that, as commercially released, contains 24 MP3 files that require 80 megabytes of storage and plays at normal speed for a total of almost 9 hours. In order to use these files with existing mass download technology, the user must manually keep track of which file is currently being listened to and where one is in that particular file.

Tracking problems also develop if the users audio player automatically changes files, if the user is listening to multiple audio streams and/or if the user listens to audio streams on more than one client device (e.g. if a user is listening to the audio stream at work and wants to resume play at home). It can be particularly difficult and time consuming for the user to resume listening to an audio stream at a specific position.

SUMMARY OF THE INVENTION

The instant invention obviates some of the above-described disadvantages by segmenting an audio stream into a plurality of small digital audio files using gaps in the natural language of the audio stream. These small digital audio files are transmitted, loaded, and played, in a specific order, such that from the user's perspective, the audio stream is reproduced in an apparently seamless manner. Advantageously, this is done without reassembling the audio stream, either in whole or in part. Further advantageously, since the small digital audio files are created using natural language gaps, they can be sufficiently small to ensure that a first small digital audio file is downloaded and played without significant delay, while successive small digital audio files are downloaded to be played in the future. Accordingly, the user receives the audio-on-demand in a timely manner.

The instant invention further obviates some of the above-described disadvantages by providing a virtual audio stream descriptor, which includes a record of the position of each small digital audio file in the audio stream, to increase tracking options. More specifically, the virtual audio stream descriptor and one or more predetermined time offsets into the audio stream are used to position or reposition the audio stream at will. The predetermined time offsets are typically provided via internal media marks, external media marks, and/or rewind/fast-forward functions.

An aspect of the present invention relates to a method of downloading digital content to be rendered, comprising: downloading from a network accessible server to a client device a list of content servers that are capable of serving requested digital content; tracking service level statistics for the content servers in the list of content servers; selecting a first content server to serve the requested digital content from the list of content servers in dependence upon the service level statistics; downloading a first segment of the requested digital content from the first content server to the client device for rendering; in the event of a degradation in service from the first content server, selecting a second content server to replace the first content server in serving the requested digital content from the list of content servers in dependence upon the service level statistics, wherein the server replacement is substantially imperceptible; and downloading a second segment of the requested digital content from the second content server to the client device for rendering.

Another aspect of the present invention relates to a non-transitory computer-readable storage medium having stored thereon instructions which, when executed by a processor of a computing device, cause the computing device to: download from a network accessible server a list of content servers that are capable of serving requested digital content; track service level statistics for the content servers in the list of content servers; select a first content server to serve the requested digital content from the list of content servers in dependence upon the service level statistics; download a first segment of the requested digital content from the first content server for rendering; in the event of a degradation in service from the first content server, select a second content server to replace the first content server in serving the requested digital content from the list of content servers in dependence upon the service level statistics, wherein the server replacement is substantially imperceptible; and download a second segment of the requested digital content from the second content server for rendering.

BRIEF DESCRIPTION OF THE DRAWINGS

Further features and advantages of the present invention will become apparent from the following detailed description, taken in combination with the appended drawings, in which:

FIG. 5d shows an embodiment of an illustration structure;

FIG. 5e shows an embodiment of an advertising structure;

FIG. 5f shows an embodiment of a catalog index structure;

FIG. 5g shows an embodiment of a server list structure;

It will be noted that throughout the appended drawings, like features are identified by like reference numerals.

DETAILED DESCRIPTION OF PREFERRED EMBODIMENTS

Figure 1:
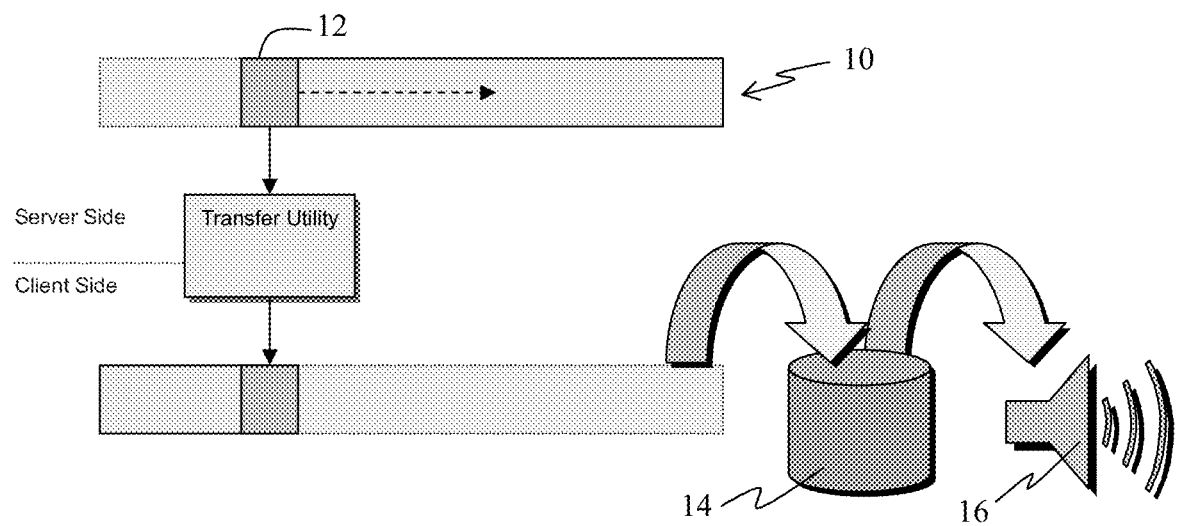
FIG. 1 is a schematic diagram showing the prior art mass download of an audio stream.
Figure 2:
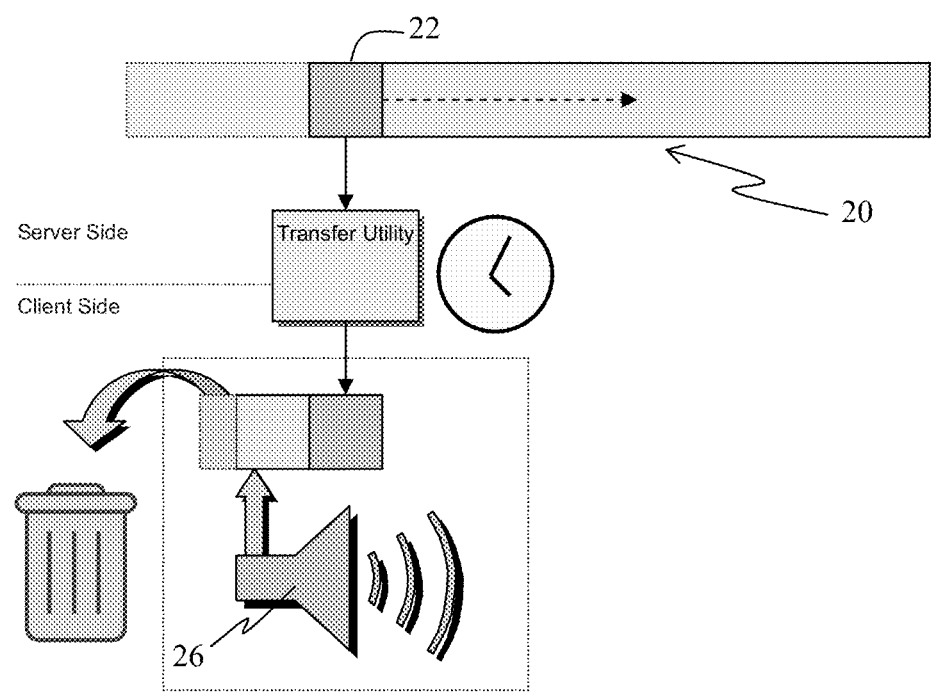
FIG. 2 is a schematic diagram showing prior art streaming of an audio stream.
Figure 3:
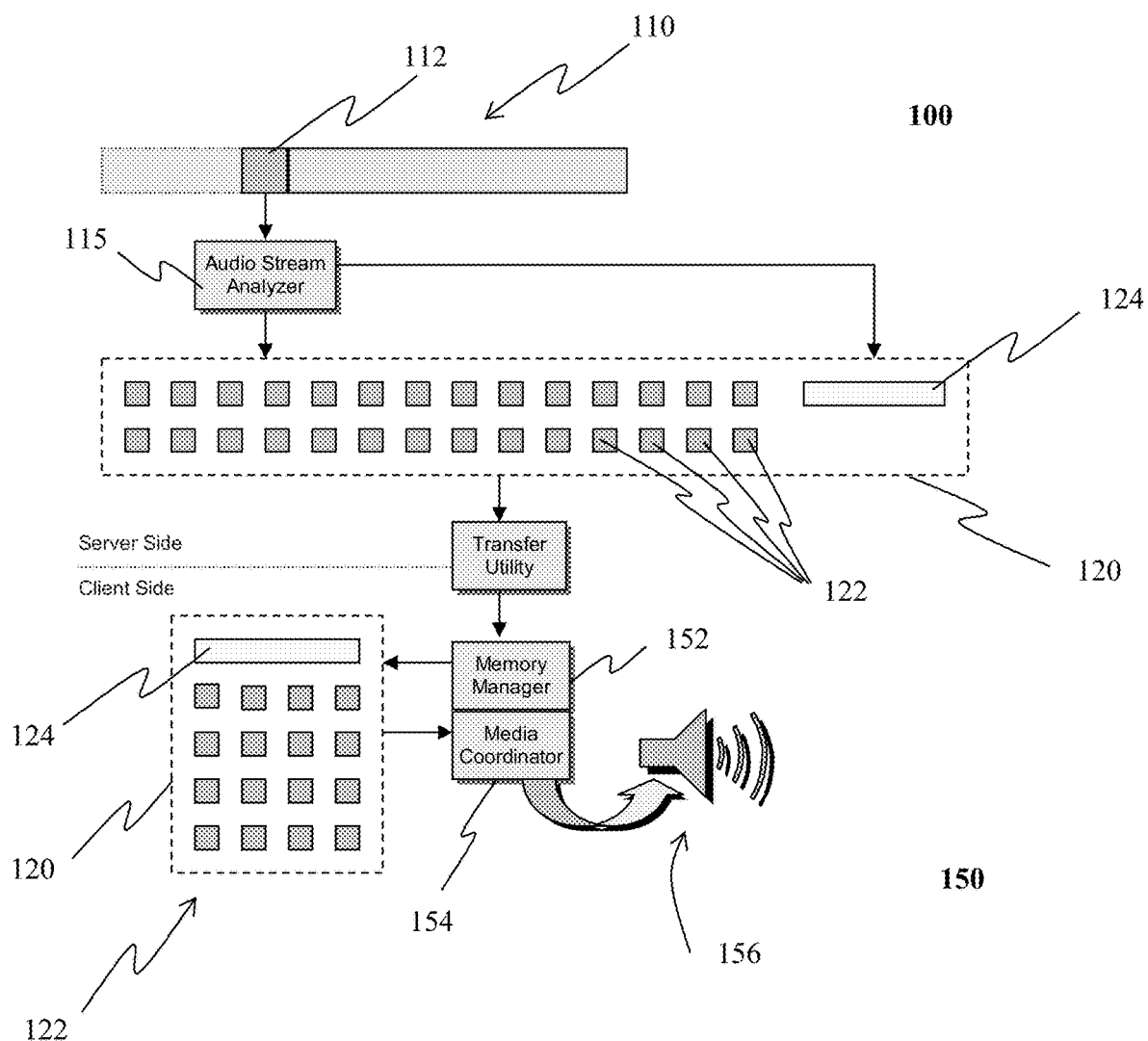
FIG. 3 is a schematic diagram illustrating the transmission of an audio stream in accordance with one embodiment of the instant invention.

Referring to FIG. 3, there is shown a system for transmitting digital audio data in accordance with one embodiment of the instant invention. The system includes a server 100, a client 150, and a network (not shown) for connecting the server 100 and the client 150.

On the server side 100, an audio stream analyser 115 is provided for analysing large digital audio files 110 frame by frame 112, and for segmenting the large digital audio files 110 into a plurality of small audio files 122. More specifically, the audio stream analyser 115 locates areas of silence or low decibel levels, hereafter referred to as gaps, within the audio stream. When these natural language gaps are found, and after more than a specific amount of content has been processed, that content is written to a small audio file. This parsing process is repeated until the entire audio stream has been split, or segmented, into the plurality of small audio files 122. In general, the size of each small audio file is selected such that it can be transferred from the server 100 to the client 150 in a period of time that that does not cause appreciable consternation on behalf of the user. For example, as a benchmark for success, this time frame is similar to that used in the telephone industry when a subscriber lifts a receiver and waits for a dial tone. Accordingly, a two second wait is considered to be close to the maximum tolerable delay, with the optimal target being in the sub-second range. The actual size range of the small audio files will be dependent on the network throughput rates. As a result, as network speed increases, the upper limit on the size of the segments will also increase.

The audio stream analyser 115 also analyses each small digital audio file to determine the start time, end time, and/or play time of the small digital audio file within the audio stream 110. This information is recorded in an index file 124

(e.g., an XML document). The index file 124, which is a virtual description of the actual audio stream, provides the information needed by a media player to reproduce the experience of a contiguous audio stream for the user without reconstructing the audio stream. The term 'actual audio stream' as used herein, refers to the plurality of small digital audio files that comprise the entire audio stream, and that when played sequentially, provide an apparently seamless audio experience. According to one embodiment, each of the small digital audio files is named using a number (e.g., eight-digit decimal number) that indicates its logical order in the actual audio stream.

In addition to providing actual stream details (i.e., the information for locating and managing the plurality of small digital audio files), the virtual audio stream descriptor 124 also typically includes descriptive details used to describe the content of the audio stream, such as the title and/or ISBN. Optionally, the virtual audio stream descriptor 124 also includes internal media marks, illustrations related to the audio stream, and/or internal advertising. Internal media marks are used to identify a specific point in time in the audio stream that is offset from the beginning of the audio stream. More specifically, they generally point to a time offset associated with some user readable tag such as a table of contents, an index, a list of tables, a list of figures, footnotes, quotations, a list of illustrations, etc. Illustrations related to the audio stream and/or internal advertising may include graphics, static images, moving images, and/or other audio-visual content that is displayed for a fixed duration.

Figure 4:
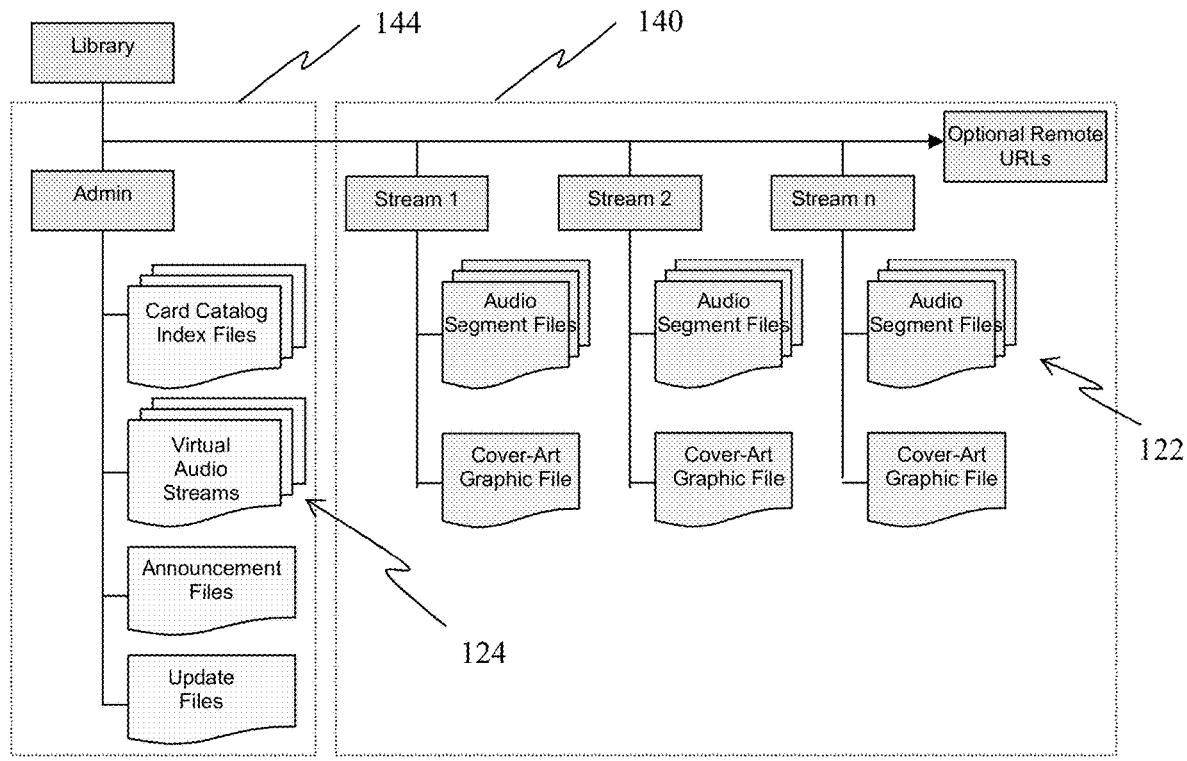
FIG. 4 is a schematic diagram of one embodiment of a network based library.
Figure 5A:
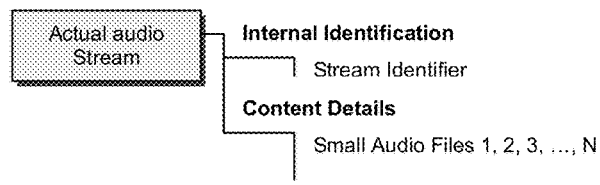
FIG. 5a shows an embodiment of an actual audio stream structure.
Figure 5B:
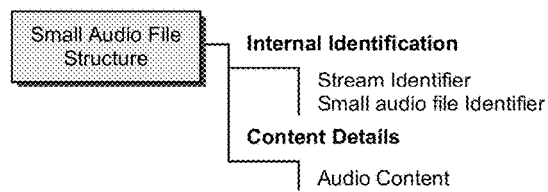
FIG. 5b shows an embodiment of a small digital audio file structure.
Figure 5C:
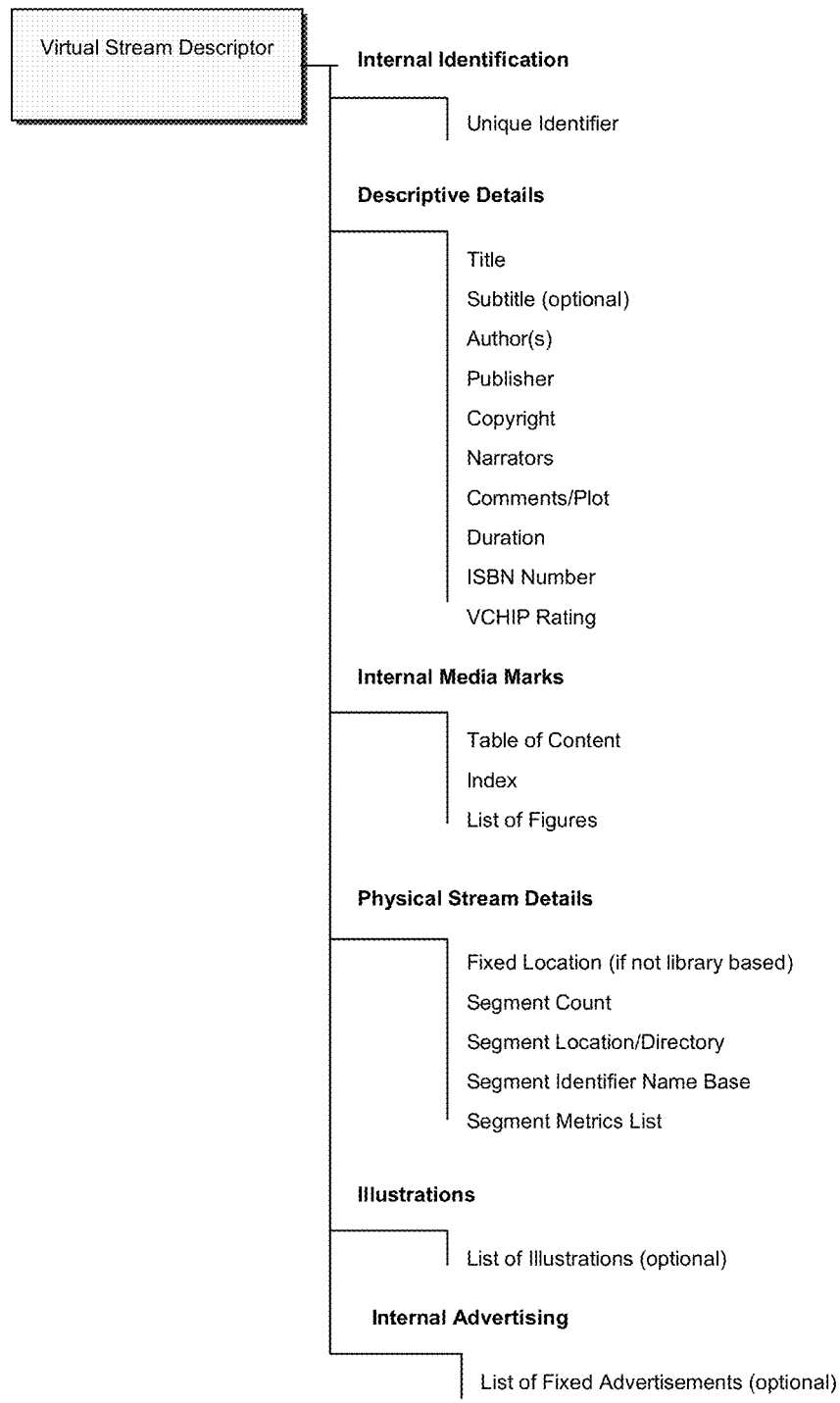
FIG. 5c shows an embodiment of a virtual audio stream descriptor structure.

In general, the virtual audio stream descriptor 124 and the actual audio stream 122 will be stored together in a same location 120 on the server 100. For example, according to one embodiment the plurality of small audio files 122 and the virtual audio stream descriptor 124 are stored in a same directory of a library residing on one or more servers on the Internet. According to the embodiment illustrated in FIG. 4, the plurality of small audio files 122 and the virtual audio stream descriptor 124 are stored in the same library, but in different areas. More specifically, the virtual audio stream descriptors 124 are stored in an area for administrative files 144, whereas the plurality of small audio files 122 is stored in an area for actual audio streams 140. The area for actual audio streams 140 includes n directories for storing n audio streams, each with a corresponding cover art image. The cover art image, which is a graphic file, is intended to provide a user with a familiar look and feel of a book cover and/or to provide easy recognition. Optionally, one or more of the n directories is located at a remote URL.

The administrative files, which include the virtual audio stream descriptors 124, typically use the electronic equivalent of a card catalog to provide a simple, easy to use method of navigation and access of the actual audio streams. In general, these card catalog index files (e.g., XML documents) will include a hierarchical structure of cascading indexes that relate in various ways. For example, according to one embodiment the card catalogue will include indices based on keywords such as historical, detective, suspense, action, etc. The references contained in each index point to other index structures or to a specific virtual stream descriptor. Each index structure contains a reference to its parent index structure, thus allowing navigation in both directions (i.e., up and down the branch of hierarchy). Each media entry may appear within the structure of the entire index multiple times, to allow reference and/or navigation from many points. The structure of the index is such that endless navigation loops caused by circular definitions are not possible.

The administrative files also optionally include announcements, updates, and a server list (not shown). Announcements, which for example may be in an XML file, are typically informative or instructive in nature. The updates, which may include programs, data files, instruction files, setup files, and/or other text, typically contain information for providing a maintenance update. The server list (not shown), which may also be an XML document, typically contains a list of servers that are available on the network and that can provide general library and content information. In general, each server listed will be a mirror of the primary server (also included in the list).

Figure 6:
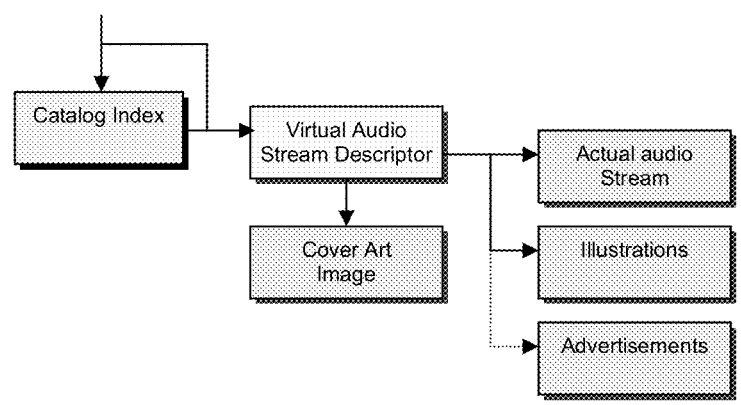
FIG. 6 is a schematic diagram showing card catalog index structure relationships.

FIGS. 5*a*-*g* show examples of data structures of: a) an actual audio stream, b) a small digital audio file, c) a virtual stream descriptor, d) illustrations, e) advertising, f) a card catalog, and g) a server list, respectively. FIG. 6, which shows the structure relationships, demonstrates that the actual audio stream, illustration, advertisement, and cover art image structure (not shown) are each referenced as a target structure from the virtual audio stream descriptor. Each of the actual audio stream, illustration, and cover art image structures also contain a reference identifier back to its parent structure. In contrast, the announcement structure (not shown) is functionally independent of other information bearing structures.

Figure 7:
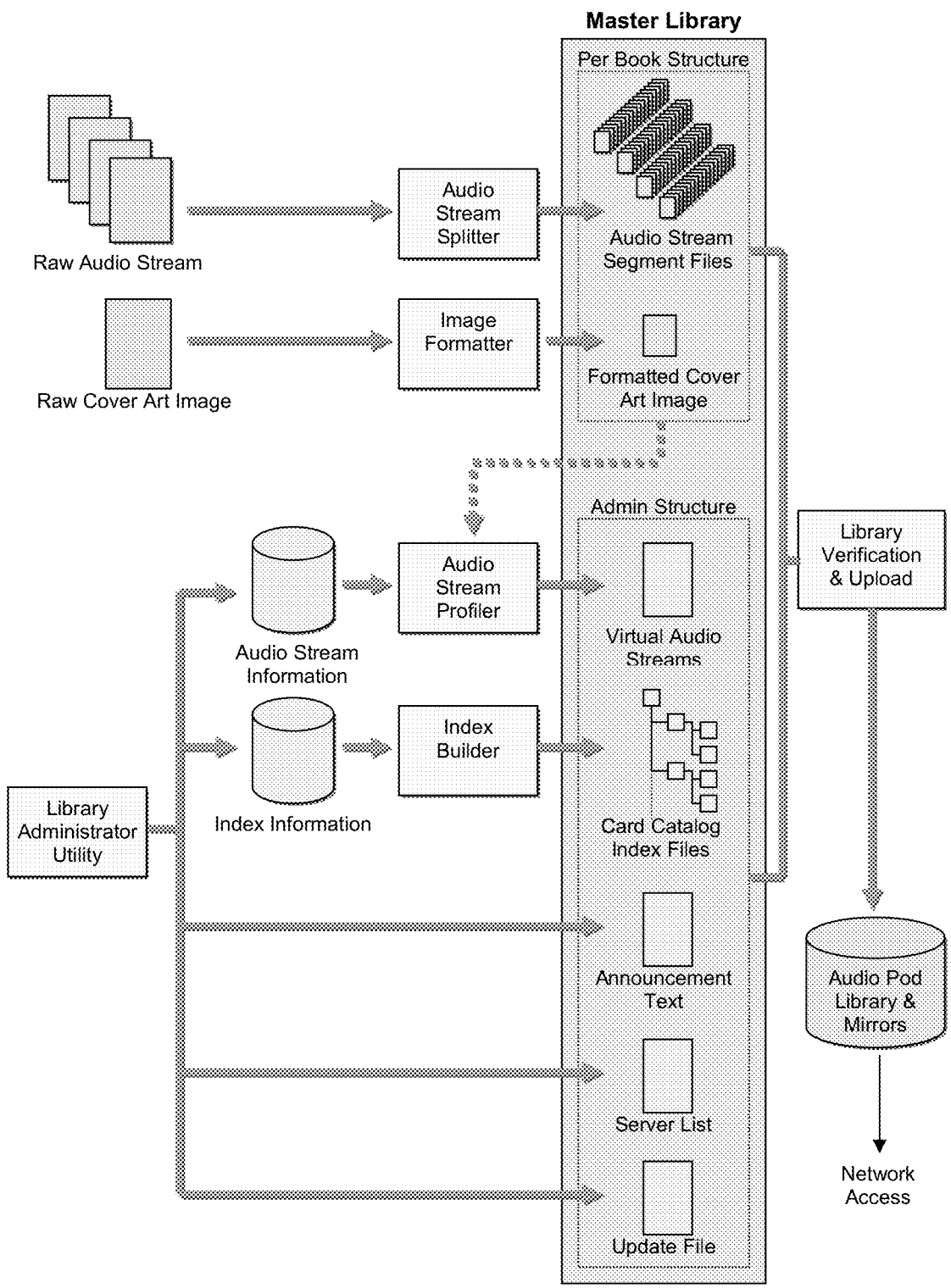
FIG. 7 is a schematic diagram illustrating one embodiment of a library creation process.

An embodiment of a process used to create an audio book library is shown in FIG. 7. The audio stream, in raw form, is acquired from either a publisher or is imported from an audio media or conversion routine. The raw files are analysed using natural language gaps and are segmented into the plurality of small digital audio files (i.e., segment files) that form the actual audio stream. Book cover art is imported and formatted, if required. The plurality of small digital audio files and cover art image are placed in a unique directory, which is local or at some remote URL. Audio stream information that describes the audio stream is manually entered using the library administrator utility to create a virtual audio stream descriptor for each audio stream. Information that describes the location and structure of the actual audio stream is provided using the audio stream profiler. The administrator utility is also used to build a series of integrated index files that make up the card catalog for the library, and to provide tools to maintain updates, server lists and announcements. Preferably, this master library is replicated on a number of mirror sites that are also made available on the network. Following updates to the master library, an automated verification utility ensures that network accessible copies of the library (i.e., the one or more mirror sites) are also updated to ensure the integrity of the system.

Figure 8:
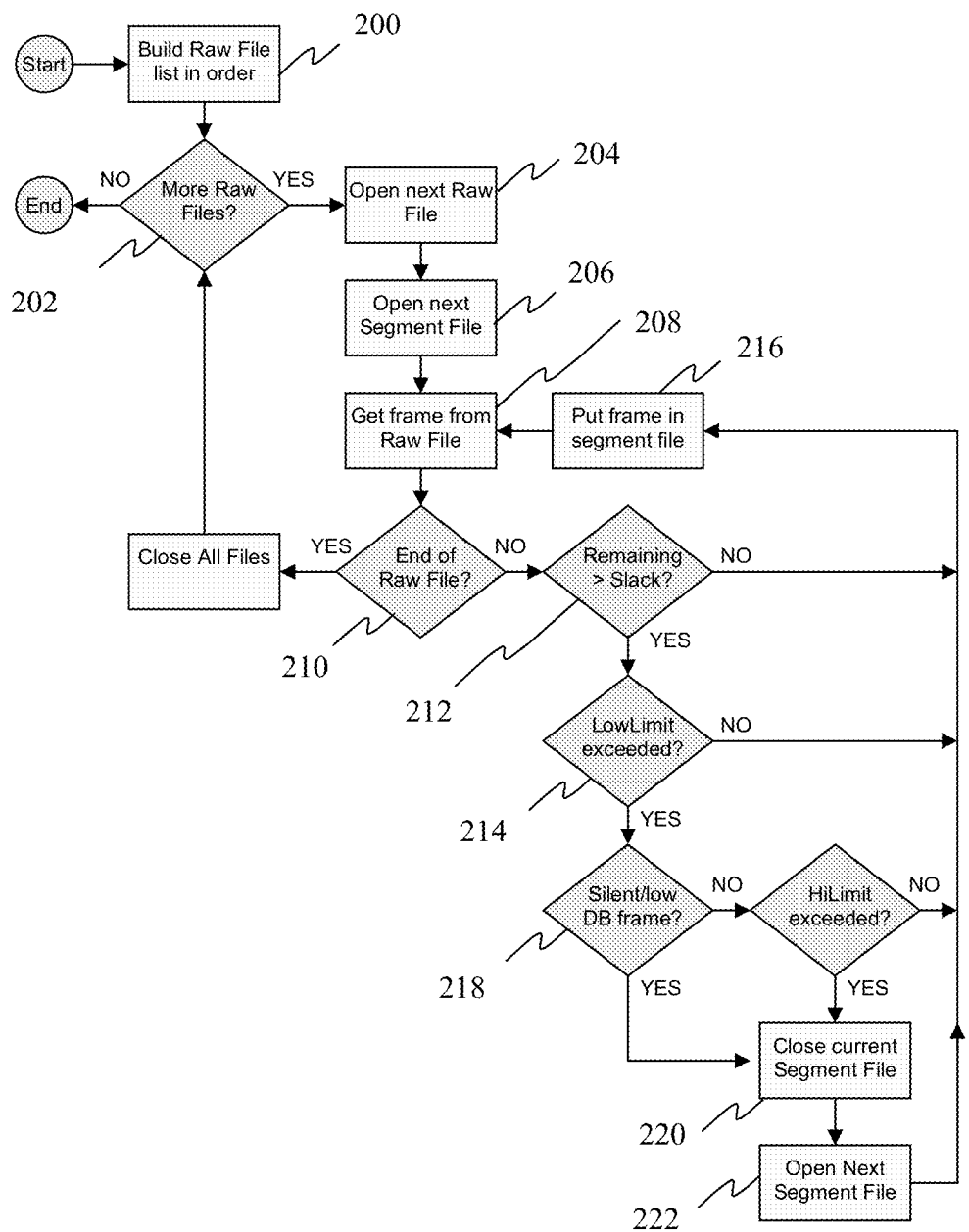
FIG. 8 is a schematic diagram illustrating one embodiment of an audio stream splitter process.

Referring to FIG. 8, the segmentation of the raw files is discussed in further detail. In a first step, 200, the list of original raw audio files is built in logical order. These files are processed one at a time. More specifically, after confirming the existence of a raw file 202, the raw file is opened 204, a segment file is opened 206, and a frame is obtained from the raw file 208. Assuming the frame does not correspond to the end of the raw file 210, and that the segment file has not reached an arbitrary minimum size 214 (e.g., 100 kilobytes), the frame is written to the segment file 216. After this limit is reached, audio frames are analysed looking for a period of silence or low decibel levels 218. If this period of silence is found, or if the upper size limit (e.g., 250 kilobytes) of the segment file is exceeded, the current segment file is closed 220 and a new output small audio file is opened 222. In the event that the unprocessed raw file content is less than a slack limit 212 (e.g., 25 kilobytes), the testing for silence and the upper limit testing is not performed and the remaining audio frames are written to the then current segment file. According to one embodiment, this method is used to find periods of silence between chapters, paragraphs, sentences, phrases, words, and/or at punctuation marks. Optionally, the audio stream splitter/analyser 115 searches for long periods of silence, which are subsequently truncated. For example, periods of silence that exceed 2 seconds in length have been found to make users assume that a problem exists in the delivery or replay of the audio stream. In order to eliminate these user concerns, periods of silence that exceed 2 seconds in length can be truncated, and the audio content that has been truncated, discarded.

Referring again to FIG. 3, the client side includes a memory manager 152, a download manager (not shown), a media coordinator 154, and a media player 156. The memory manager 152 is a complex memory manager used to maintain the integrity of the actual audio stream, which is transferred from the server 100 to the client 150 using a standard transfer utility (e.g., FTP). The function of the memory manager 152 is to ensure that there is sufficient memory available to receive large numbers of small digital audio files, to ensure that sufficient audio content is available when needed, and to ensure that a quantity of already heard audio content is maintained (e.g., so a user can rewind the audio stream to review recently heard content without repeated downloads). The download manager is responsible for obtaining the small audio files that make up the audio stream. The media coordinator 154 delivers the plurality of small digital audio files in the appropriate order to the media player 156. The memory manager 152, download manager (not shown), and media coordinator 154, are all part of an integrated, network-based software product used to control the media player 156.

According to one embodiment, the software product is a user-friendly interface that allows the user to select an audio stream, to download a small digital audio file representing a selected part of the selected audio stream, to play the small digital audio file relatively quickly (e.g., within 2 to 5 seconds), and to download and play the logically next small digital audio file such that the transition between successive small audio files is apparently seamless.

According to one embodiment, the software product includes computer-readable code that allows the user to use a plurality of navigation buttons to access a network-based library card catalog, bookmarks, cover art images, and/or announcements/updates. As discussed above, a network-based library card catalog, which may index audio streams in a hierarchical fashion such that there are many possible paths to reach a single audio stream, is typically stored on a network-based library for the navigation thereof. According to one embodiment, once the navigation button for the card catalogue is selected the user is able browse through a series of keywords describing a plurality of audio streams, to select an audio stream from the network based card catalogue, to load a profile of the selected audio stream, and/or to download the selected audio stream. According to one embodiment, the profile includes information obtained from the descriptive details entered into the virtual audio stream descriptor.

Bookmarks are external media marks (i.e., external to the virtual audio stream descriptor) that allow the user to identify and/or access an audio stream at any point within that audio stream. Similar to internal media marks, each bookmark provides a time offset from the beginning of the audio stream. In other words, if an audio stream starts at time zero and continues for some elapsed time to a maximum duration, the bookmark identifies a specific point in time in the audio stream that is offset from the beginning of that audio stream. The bookmark also identifies and/or points to the virtual audio stream descriptor of the target audio stream (e.g., in a local directory or at some network address). Using the time offset and the information in the virtual audio stream descriptor, the software product is able to select the appropriate small audio file to be played. Moreover, the exact position within the small audio file can also be calculated as a local offset to ensure correct positioning within that small audio file.

Figure 9:
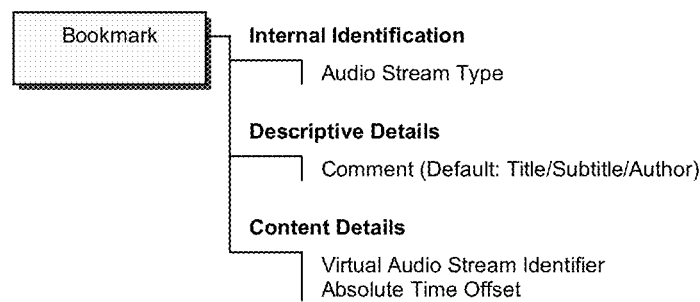
FIG. 9 shows an embodiment of a bookmark structure.
Figure 10:
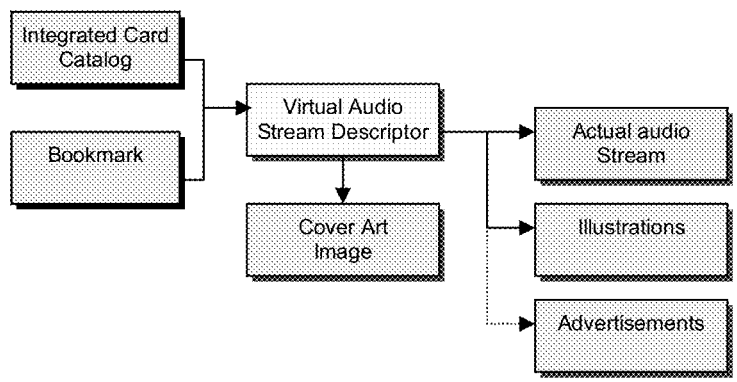
FIG. 10 is a schematic diagram showing virtual audio stream structure relationships.

Bookmarks are typically, but not always, created by the client software. For example, if the media player is stopped in the middle of an audio stream, a bookmark is created and stored. Alternatively, the user creates a bookmark using a 'make bookmark' command. More than one bookmark may be created for each audio stream. The bookmark identifies the bookmarked audio stream and the time offset of the bookmarked position. Optionally, to assist the user of the audio stream in 'picking up where you left off', a predetermined time (e.g., 30 seconds) is subtracted from the time offset of the bookmarked position and stored as the new time offset. Optionally, the predetermined time is listener selectable. FIG. 9 shows an example of a data structure for an external bookmark, whereas FIG. 10 illustrates the structure relationships. Notably, the virtual audio stream descriptor may be addressed from either the integrated card catalog or the bookmark. Optionally, the virtual audio stream descriptor is addressed in another manner.

Since the bookmark only contains references to the audio stream, and does not contain any part of the audio stream itself, the bookmark can be transferred from client to client or from server to client without violating the copyright of the work product contained within the audio stream. For example, a user can bookmark an audio stream at an interesting point and e-mail that bookmark to friends without violating copyright. Clearly, the ability to position an audio stream at some arbitrary point without the need for that media to be resident provides great flexibility. Moreover, the nature of the bookmark makes it independent of the physical structure of the audio stream. This allows changes in media and format without corrupting the integrity of the mark or the audio stream. Examples of such changes include changing bit and scan rates in MP3 files, changing from MP3 to .wav format, changes to the actual audio stream, small audio file structure, and/or reformatting of the audio stream itself. According to one embodiment, the bookmark is an XML document.

The bookmark navigation button allows the user to view a list of bookmarks corresponding to open audio streams (e.g., a book that has been accessed and partially read), to select a bookmark, and to play the audio stream at the bookmarked position. For example, the software product may list the bookmarked audio streams in the descending order of the date and time that the audio steam was last read.

According to one embodiment, the software product includes computer-readable code that allows the user to use a plurality of standard player control buttons to begin playing the audio stream, stop playing the audio stream, and/or fast forward within the audio stream. Notably, the rewind and fast-forward control buttons do not actually act on the audio stream. Rather, these two functions are used to advance or retard the time offset that indicates the then current position in the audio stream. For example, rewind will cause this offset to decrease to a minimum of zero (e.g., seconds), whereas fast forward will increase the time offset to a maximum of the upper limit of the audio stream duration. Accordingly, the user is able to fast forward and rewind through the audio stream, even if the audio content is not resident. In particular, after the time offset has been adjusted to where the user desires, if the relevant small audio file is not resident, it is obtained from the library, again in the 2 to 5 second range. The small audio file is then loaded, positioned and played.

According to one embodiment, the software product includes computer-readable code that provides a number of different displays, including for example, a basic display, an introduction display, a bookmark display, a library card catalog display, a book details display, a book player display, and a book cover display. These displays provide appeal and/or familiarity to the user. For example, the basic display may provide a decorative skin or frame to standardize the appearance of the software product when played on different platforms (e.g., desktop, laptop, personal data assistant, cell phone, dedicated device, etc), whereas the introduction display may appear during the start up of the program. Other displays, such as the bookmark display, library card catalog display, and/or book details displays may provide the navigation buttons. The book player display may show the book that is currently loaded into the player, the book title, author, copyright, and/or book length. The book player display may also provide the standard player control buttons discussed above. Optionally, the book player provides a content level indicator, which is a measure of the amount of continuous content that is resident beyond the current position in the book, and/or a positive feedback feature, which is used to inform the user that the player is active. According to one embodiment, the navigation and/or control buttons are selected using standard data entry techniques, which for example, may use a mouse, keyboard, touch pad, and/or touch sensitive screen. If the latter is provided, a virtual keyboard is typically provided.

According to one embodiment, the software product also provides a number of other displays including a set-up display, a notes display, a quotations display, and/or a contact list display. The set-up display allows the user to enter/change user account name, password, default server information, DNS name of server, communication ports of the server, and/or secure sockets. The notes display allows the user to enter or select personal notes, which may be edited and/or e-mailed to other clients. In general, the note file may include a unique numerical identification of the audio stream, a tag to the audio stream, a user defined title, comments, the author of the comments, and/or the date and time the note was created. The quotation display allows the user to enter or select various quotations, which may also be edited and/or e-mailed to other clients. In general, the quotation file may include a unique numerical identification of the audio stream, the start and end point of the quotation in the audio stream, a user defined title, and user defined comments. The contact list display allows the user to maintain a list of names and e-mail address used by the software product.

According to one embodiment, the software product includes computer-readable code that provides client-based performance management. The performance level of the digital audio data delivery is an important factor in ensuring the integrity of the audio stream available to the user. The purpose of client-based performance management is to ensure that the client software receives service at or above minimum levels. According to one embodiment, this service is automated and is provided transparently to the user utilizing any then current available network resource to do so. In other words, the user is not aware of the source of the service or the mechanics of accessing that service.

For performance management purposes, the client software views the network and library server as a single entity. To ensure performance levels, the client software maintains statistics for service level for each library server. These server statistics are used when attempting to find the historically fastest server. This file is created and maintained in the client only. If service levels fall below a minimum acceptable level, the client software goes through the list of servers described above to determine which server has the best historical record of service. The client software selects this new server as the primary provider. Notably, using performance management may result in the user receiving small digital audio files from more than one server for the same audio stream.

Figure 11:
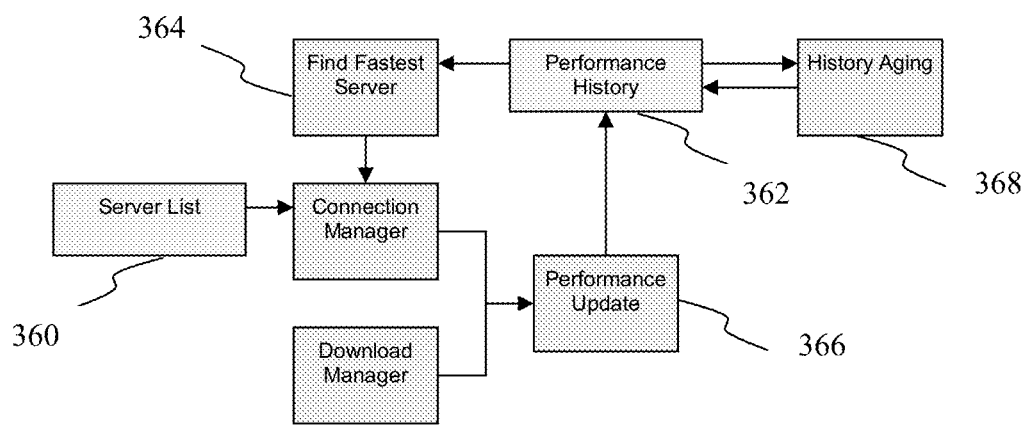
FIG. 11 is a schematic diagram illustrating one embodiment of a performance management process.

The performance management logic is built into lower level functions that perform various network and library based functions. These include 1) Logging in to a server; 2) Obtaining a file from the server; 3) Obtaining file size and creation dates. Referring to FIG. 11, the initial steps taken by the client software are to load the list of servers 360 available for use and the historical transfer statistics 362. The fastest server from the list is then selected 364 as the primary server. If the server is not available or fails to respond, the next fastest server is selected. The process continues until a server is reached. If no servers are available, the default server entered is used. Servers that are found to be slow or are continually in error will have their transfer rate increased based on one of two values 366. The value is either the total elapsed time of the transaction with the server or an error value equal to a predetermined transaction delay (e.g., one minute). As time goes on, these operational statistics are aged 368 to reduce the effect of errors or network delays. Servers are slowly aged until such time as their statistics are not less than the average for all servers. The result of the aging process means that, assuming no additional delays or errors, the operational average will decrease to some baseline average that will be greater than the fastest servers but still make the aged servers available in the future. With the then current fastest server established, that server is used as the target of all library operations. A connection must be established to the network in order to communicate. Each operation including, but not limited to login, get file and get file size are timed to see how long each transaction takes. This testing is built right into the lower level logic of the client software. In the event that a server is failed out as a result of error or degradation, a new server is selected to take its place. This server replacement occurs in the same manner that is customarily used for a non-fatal error. That is, the transaction is retried following the server replacement process without the upper levels of client software logic or the user becoming aware that it has occurred. In this way, the client software is able to balance network and server loads on the basis of performance without intervention from any other level.

According to one embodiment, the software product uses a universal ISBN server, which is designed to provide a simplified means to locate network-based library services from one or more suppliers on a network. The ISBN server may be located on the Internet for global access or on various intranets for use by various public or private organizations. The purpose of the ISBN server is to receive a request from a client device and return a list of one or more servers. The request from the client device will include a unique ISBN number or other unique identifier. The ISBN server will look up the unique identifier in a preloaded database and assemble or extract a list of servers capable of supporting library services for that identifier. This list is then returned to the client device. Upon receipt of the list of library servers, a selection is made from that list as the preferred provider of library service (e.g., as discussed with regards to client based performance management). The selected server is then accessed to acquire the virtual audio stream descriptor that goes with the unique identifier originally provided by the client.

Preferably, the software product, including the computer-readable code, is stored on a computer readable storage medium on the client side of the system 150. The computer readable code is then used to access information structures and files that reside on one or more servers on the server side of the system 100 (e.g., within a server farm). Information transfer from client to server is accomplished using industry standard server software, tools and utilities. A summary of various types of information, structures or files is provided in Table 1.

TABLE 1

Various types of information, structures, and files

| Information Type | Content |
| --- | --- |
| Administrative | Contains information, structures and files that are used to facilitate access to media contained within the library and maintain the operational environment status of the client software. |
| Announcements | Contains announcements that could be used in a number of ways, typically to inform users and keep them up to date on current or upcoming events or news. |
| Server List | Contains the primary server site and a list of library mirror sites capable of maintaining audio stream continuity for the consumer in the event of degraded or interrupted service. |
| Performance History | Contains a list of historical throughput performance and failure rate metrics for the library primary and mirror sites. Present only on the client platform. |
| Updates | Contains the actual files and information needed to perform network-based updates while online using automated routines provided. |
| Catalog Index | Contains the cross-reference information needed to access subordinate catalog indexes and to access virtual audio stream descriptors. |
| Virtual Reference | Contains information, structures and files used to provide access to and delivery of specific audio streams. |
| Bookmark | Contains the information needed to restart a specific audio stream at a specific point. |
| Virtual Audio Stream Descriptor | Contains the information that describes all aspects of an audio stream and the information needed to access and use the actual audio stream. |
| Cover Art Image | Contains a graphic or image that is used to represent the entire audio stream to the user in their own mind similar to the task accomplished by the cover art graphics on a printed book. |
| Actual audio | Contains the actual media content and supportive graphics and/or audio/video content |
| Actual audio Stream | Contains one or more small audio files that comprise the entire audio stream and that when played in order form a seamless audio experience. |
| Illustrations | If present, contains one or more graphic, image, video or audio/video portions of multimedia content intended for use with and in support of the actual audio stream. |
| Ancillary | Contains other information, structures and files used in the delivery of content not considered actual content within audio streams. |
| Advertisements | If present, contains one or more graphic, image, video or audio/video portions of multimedia content intended to be used before, during and after presentation of any audio stream subject to the requirements described in the virtual audio stream descriptor. |

Figure 12:
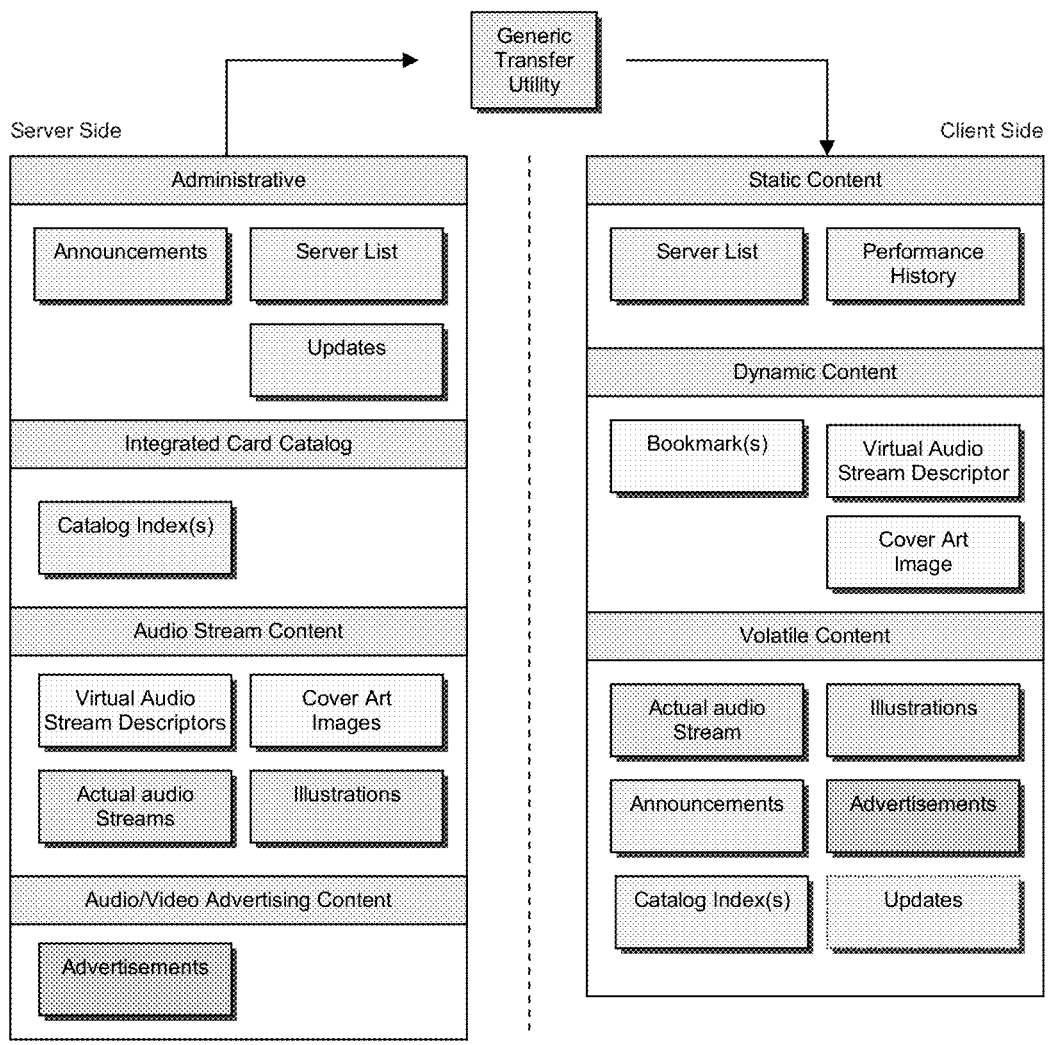
FIG. 12 is a schematic diagram illustrating information transfer and client memory status.

FIG. 12 shows the information, structures and files contained on the server side generally grouped by function. The same information, structures and files are grouped differently on the client side and, in particular, are grouped by their requirement for retention. More specifically, this schematic diagram illustrates that as information is transferred from the server to the client, it is typically organized based on the priorities defined for the memory manager. The structures used are considered more or less expendable subject to their content. Static structures contain information needed to establish and maintain connections with the servers on the network. The term static indicates that the structures, once defined, remain in place although the content thereof may change. The memory manager will preserve these structures at all costs. The volatile structures include those whose existence is short lived. The memory manager will balance the need for space with the need to retain content surrounding active bookmarks. As the demands for space increase, the content surrounding bookmarks becomes less and less. The structures that are considered dynamic are semi-permanent structures that typically exist for the duration that an audio stream remains open and bookmarked. The memory manager will make every effort to ensure that these structures are preserved, but may remove them as a final option to obtain space. Typically, the last structures to be purged are the oldest bookmark structures.

According to one embodiment, the static files are contained in a root directory, while the volatile files are contained in a spooler directory. A list of possible static and/or volatile files that may be used by the software product is provided in Table 2.

TABLE 2

List of Possible Static and Volatile Files

| Filename(s) | Contents |
| --- | --- |
| Static Files | |
| Audio Pod Directory | The directory that contains all files that are static in their existence |
| Spooler Directory | The directory that contains all files that are volatile in their existence |
| AudioPod.exe | The Audio Pod executable image |
| AudioPod.xml | The Audio Pod startup initialization file; in XML format |
| UpdateManager.exe | The Audio Pod Update Manager executable image |
| ServerList.xml | The list of libraries, mirrors and servers that are available on the network as targets for the Audio Pod Performance/Load manager; in XML format |
| ServerStats.xml | The historical rate of response statistics for all library servers; in XML format |
| BookMarks.xml | The list of active bookmarks; in XML format |
| TheEnd.mp3 | The audio stream to be played on completion of an audio stream (book) |
| ErrorAlert.mp3 | The audio stream to play when the Audio Pod must attract the attention of the user while listening to another audio stream (book) |
| Volatile Files | |
| Small Audio Files | Audio files that make up the various open audio streams (book); in MP3 format |
| Cover Art Graphic Files | Graphic files that contain images of book covers; in jpg graphic format |
| Card Catalog Index Files | Files containing Card Catalog indexes; in XML format |
| Book Profiles | Files containing Book Profiles; in XML format |
| Announcement File | File containing a notice or announcement; in XML format |
| Update File | File containing components needed to perform an update to the Audio Pod and/or any of its' components |

As discussed above, a memory purge process is used to remove volatile files to ensure that a requested level of free memory is made available. This process works directly on the contents of the spooler directory. The purging process takes different approaches when dealing with the active audio stream, bookmarked audio streams, and ancillary or support files. A demand for a significant quantity of memory is made at the opening of a new audio stream, or reopening a bookmarked audio stream. The size of the demand is subject to the ultimate size of memory available, the size of the audio stream being accessed and the volume of content from the subject audio stream that may already be resident. In the event that sufficient memory is not available, memory is purged in the following order.

Ancillary or support files that are considered volatile are removed from memory.

Virtual audio streams, supporting files and related audio content for any audio stream for which there is no bookmark are deleted.

Bookmarked audio streams are purged with increasing levels of severity until the memory demands are met.

The content of dynamic memory including virtual audio stream descriptors, and supporting files are deleted, starting with the oldest.

Figure 13:
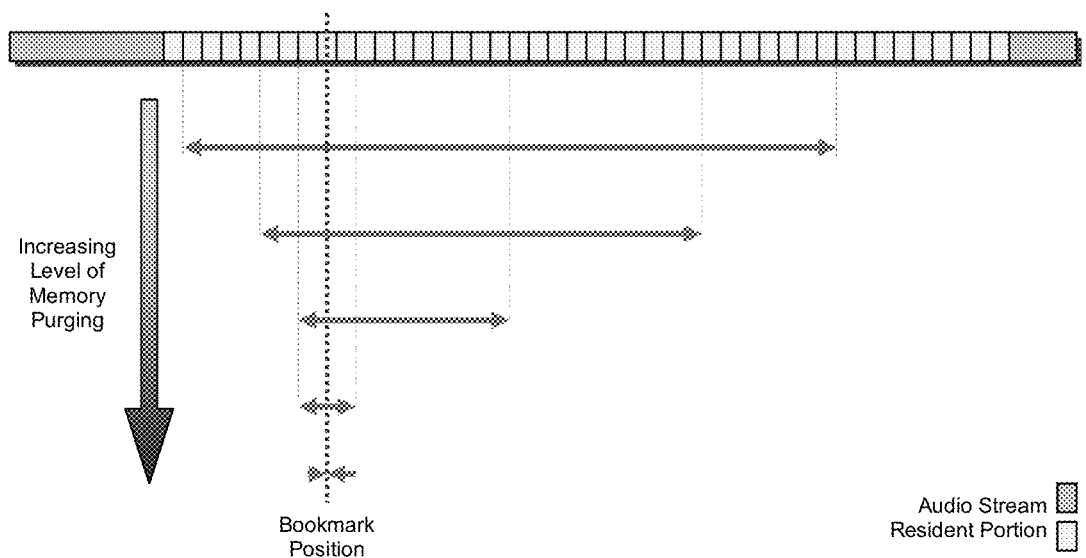
FIG. 13 is a schematic diagram illustrating one embodiment of a bookmarked audio stream purge process.

When purging bookmarked audio streams, the purging process attempts to retain as much resident content as is possible. The purge process focuses on the bookmark position within the audio stream. Some resident content is retained within the audio stream preceding the bookmarked position. This is to allow the user the ability to rewind the audio stream in an attempt to pick up where they left off. However, this quantity of content is not large and generally will not exceed 5 minutes. The main effort is to preserve as much resident content of the audio stream that follows the position. In order to satisfy the demand for memory, most, if not all, bookmarked audio streams will have some future content purged. In the event that sufficient memory cannot be obtained with an initial purge of content, the level of severity of the purge will be increased and the purge process repeated. The volume of resident content in the bookmarked audio streams is reduced. This reduction is most severe in content preceding bookmarked positions. As the levels of severity increase further, the quantity of content preceding the bookmarked positions prevents further gains through purging, and content that follows the bookmarked positions is aggressively purged. The purging process continues, reducing the quantity of content surrounding bookmarked positions until, at the ultimate extreme, no content remains. Under normal circumstances, the demand for memory will be met and this situation is expected never to arise. This process is shown in FIG. 13.

Figure 14:
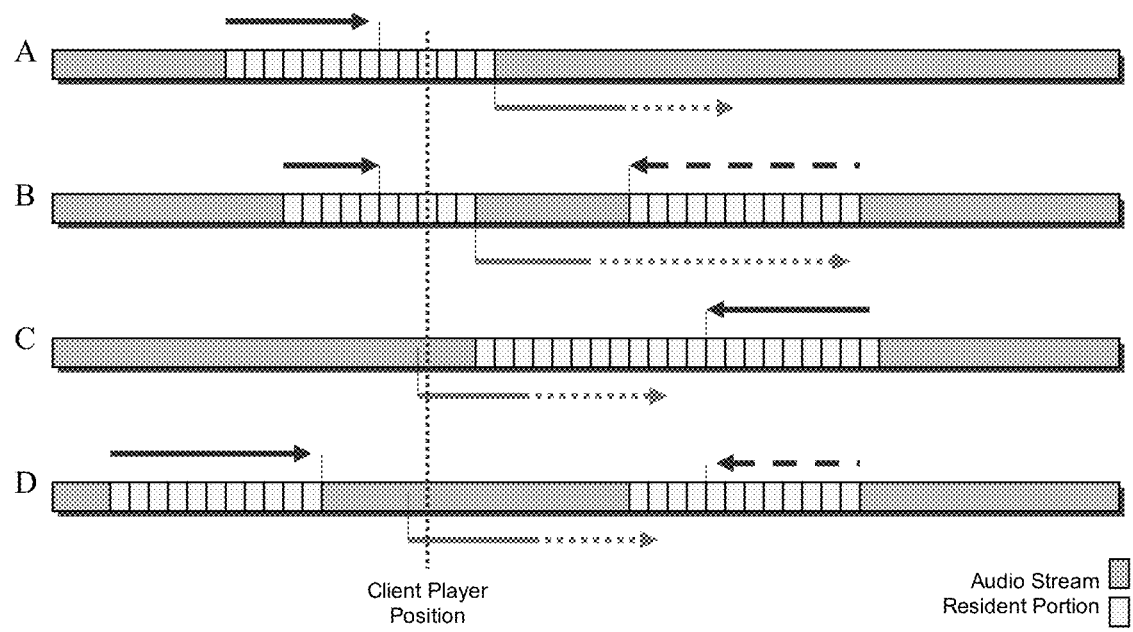
FIG. 14 is a schematic diagram illustrating one embodiment of an active audio stream purging process.

When the demand for memory is met, the selected audio stream becomes the focus of the purging process. The effort becomes one of ensuring that sufficient content is maintained around the current player position to ensure a continuous replay of the audio stream. As the player position approaches the end of available resident content, the current audio stream is purged to make room for additional content. Every attempt is made to preserve some content preceding the current player position to allow the user to rewind a few minutes to pick up the story in the event of interruption. Referring to FIG. 14, A shows the normally expected state of memory with already heard content purged and future content loaded as the player position approaches the end of resident content, whereas B-D shows the state of memory that may result when internal media marks, external bookmarks, rewind, or fast forward functions are used. In these situations, the media player position may be outside of resident content or may result in a discontinuity of resident content. In each situation, the content that precedes the current player position typically is purged prior to purging any content that follows the current player position.

According to one embodiment of the instant invention, a method of using the software product to transmit digital audio data is described as follows. A user selects an audio stream. Examples of audio streams include audio books, magazines, newscasts, radio shows, lectures, museum tours, etc, or parts thereof. The audio stream typically is selected from a card catalog, a bookmark, or other means. In general, the actual audio format of the sound information is not important.

Once an audio stream has been selected, a demand is raised to the memory manager for enough space to work with the virtual audio stream descriptor (e.g., about 250K bytes). In normal operation, this quantity of memory is routinely expected to be available resulting in no action taken by the memory manager.

The software product ensures that the virtual audio stream descriptor has been downloaded. More specifically, the volatile memory is checked for the existence of this structure and, if it is not resident, it is downloaded. A demand is then raised to the memory manager for the lesser of two quantities of memory. The first value is 75 percent of available memory. The second is the ultimate size of the actual audio stream minus the amount of any memory currently consumed by any small audio files that may already be resident.

The desired position within the actual audio stream is then ascertained. The default position is assumed to correspond a time offset of zero. If the method of selection was a bookmark, or an internal media mark, then the offset position is obtained from that structure. The offset is validated to be in the range from zero to the maximum duration of the audio stream, a value obtained from the virtual audio stream descriptor. The time offset is compared against the list of small audio file metrics stored in the virtual audio stream descriptor. When the time offset falls between the start and end times of a specific small audio file, that small audio file is identified as the target small audio file. A local time offset is calculated by subtracting the start time of that small audio file from the time offset that was the subject of the search. This local offset is retained for use when positioning the target small audio file.

If the target small audio file is not resident, then it is downloaded. The small audio file is loaded into the media player and the media player is positioned to the calculated local time offset. When the media player is started, the download manager is signalled to commence operations. The download manager purges the current audio stream and then examines the virtual audio stream and the content of volatile memory. Small audio files are downloaded sequentially. When the end of the audio stream is reached, downloading stops. If memory is exhausted and the download manager indicates that enough continuous audio content is resident, downloading stops. Otherwise, a demand for additional memory is raised with the memory manager, and the process is repeated.

As the media player advances through the audio stream, the small audio files are successively loaded and played until the end of the audio stream is reached. The current position in the actual audio stream is tracked. If the current position in the actual audio stream approaches the end of resident audio content and the entire audio stream is not downloaded, then the current audio stream is purged to make memory available for new content, and the download manager is started. New content is downloaded until the end of the audio stream is reached or memory is exhausted. This process is repeated as often as is necessary. In this manner, the software product can process complete audio streams that exceed the size of memory available.

The small audio files are contained within a common spooling area. As the spooling area fills with small audio files, the quantity of unheard audio increases. This quantity is displayed to the user. As a result, the invention can continue to play through resident unheard small audio files even during periods when out of network contact with the library. The memory manager will detect when network service is restored and continue processing as normal.

If the media player is stopped, a bookmark is created and stored. The bookmark identifies the audio stream and the time offset of the bookmarked position. The offset value stored is the current position in the audio stream less an arbitrary time. This allows the listener to 'pick up the story' when the listener resumes the current audio stream. If the listener changes the time offset into the audio stream using the rewind and fast forward buttons, or any of the media marks that may be available, the new offset position is used to position the audio stream as described above.

When the end of the audio stream is reached, any bookmarks are removed from dynamic memory. Without a bookmark, the memory manager will purge the audio stream and all references at the next signal to commence operations.

This approach allows many audio streams to be opened and bookmarked at one time. Given the actual size of these large audio streams, it will be necessary to have a memory manager capable of ensuring sufficient space is available for the most active audio streams while preserving as much physical content surrounding active bookmarks as is possible. The need to preserve actual audio content around bookmarks becomes clear when considering levels of degradation associated with the acquisition of content across the network. The ultimate goal is to have as near zero delay as is possible when resuming an audio stream. Retaining sufficient media allows audio streams to start virtually instantly, and then acquire media content as needed.

Figure 15:
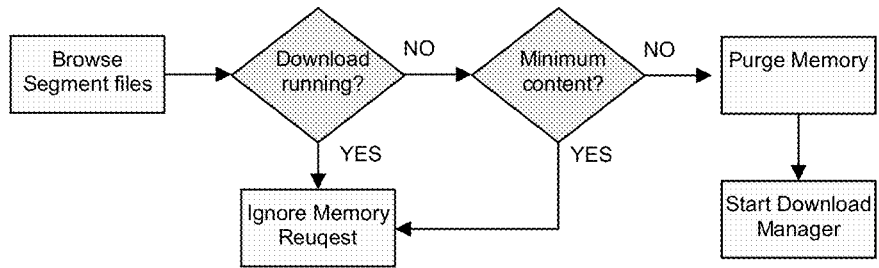
FIG. 15 is a schematic diagram illustrating one embodiment of a memory manager process.

FIG. 15 provides an overview of the memory manager process in greater detail. When activated, the memory manager first checks to see if there is sufficient audio content already resident (e.g., enough for about 5 minutes play time). If there is enough content, the remainder of the audio stream is resident or the download manager is running, then no action is taken. Otherwise, the memory manager purges the content of the audio spooler directory with the goal of freeing a specific amount of memory. With memory available, the memory manager signals the download manager to commence operations.

Figure 16:
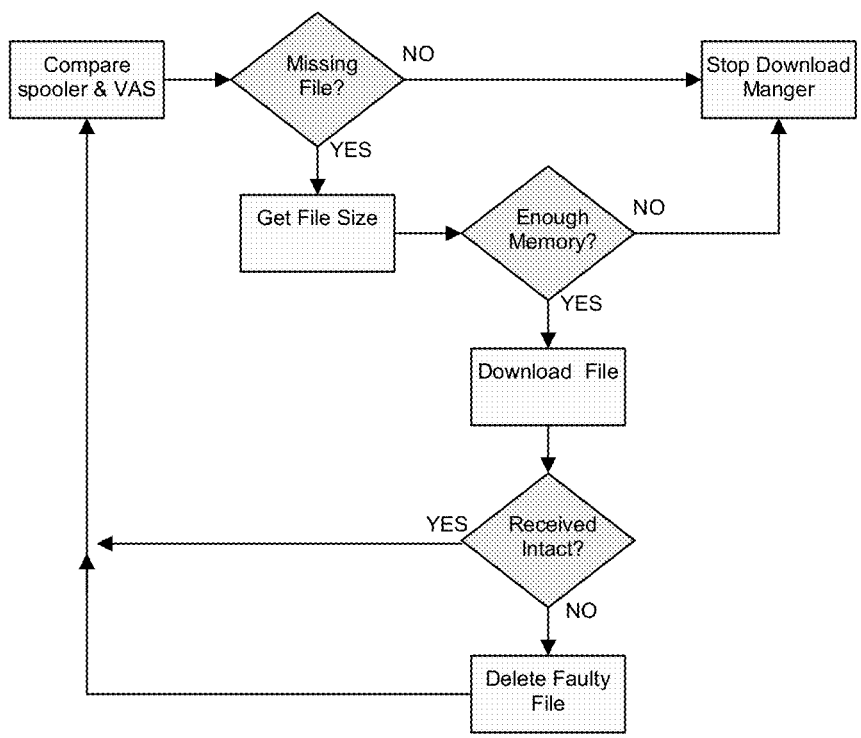
FIG. 16 is a schematic diagram illustrating one embodiment of a download manager process.

FIG. 16 provides an overview of an embodiment of a download manager process. The contents of the spooler directory are compared with the virtual audio stream descriptor and the user's current position in the audio stream. In particular, the spooler content is examined for the first small audio file that is needed to make the audio stream continuous beyond the then current position in the audio stream. If this file is missing, its size and the amount of available memory is obtained. This small audio file is then downloaded and the integrity of the file verified for size. The download manager continues to run until either memory is exhausted, or the end of the audio stream is reached. If the player is stopped while the download manager is running, the process stopping the player will stop the download manager.

Figure 17:
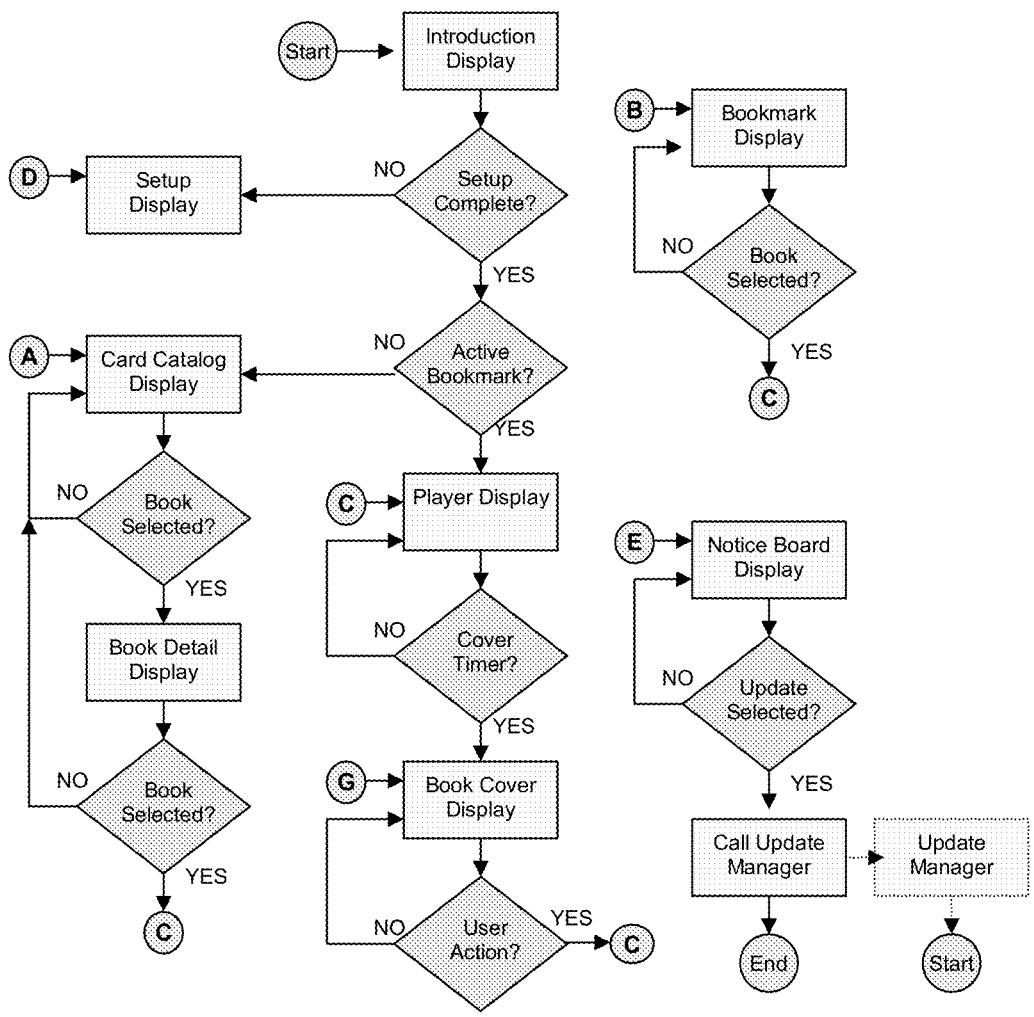
FIG. 17 is a flow diagram illustrating one embodiment of a process for using the software product.
Figure 17:
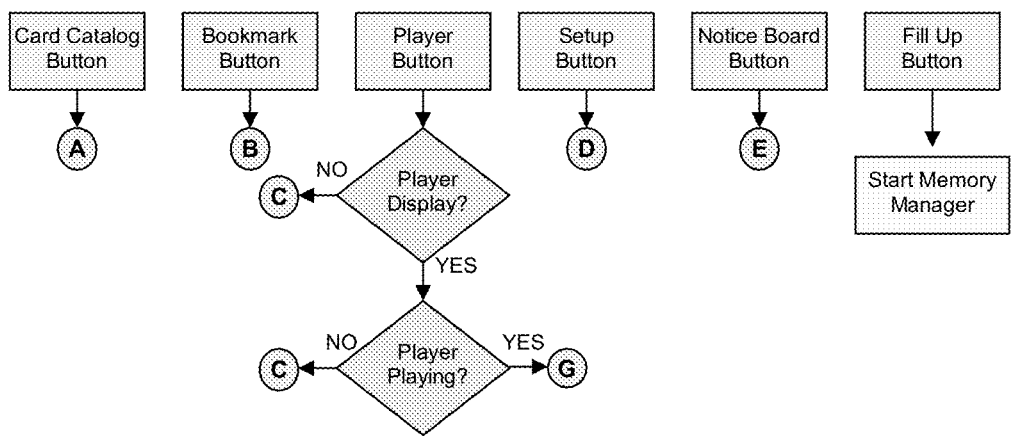
Figure 18:
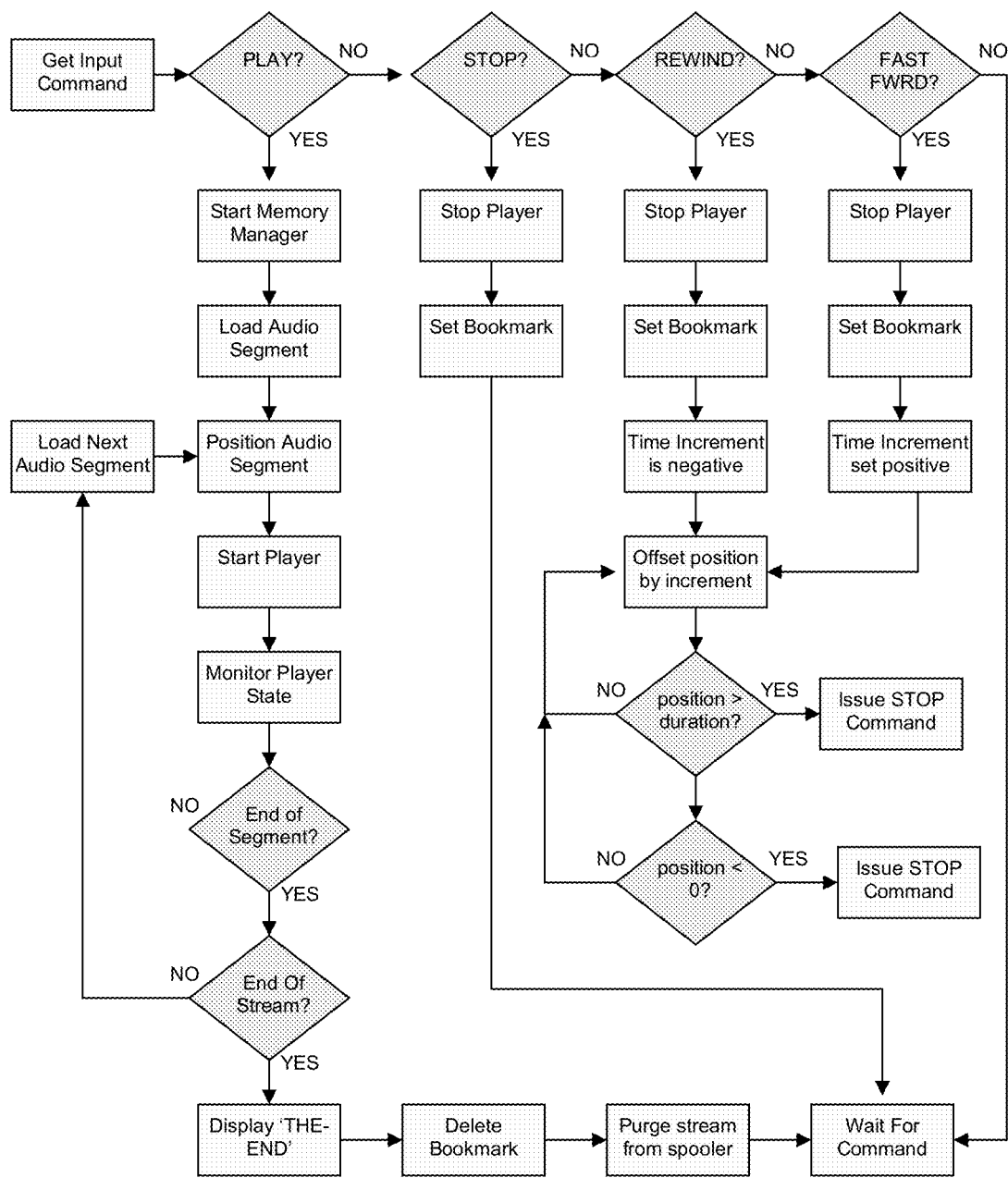
FIG. 18 is a flow diagram illustrating one embodiment of the player control process.
Figure 19:
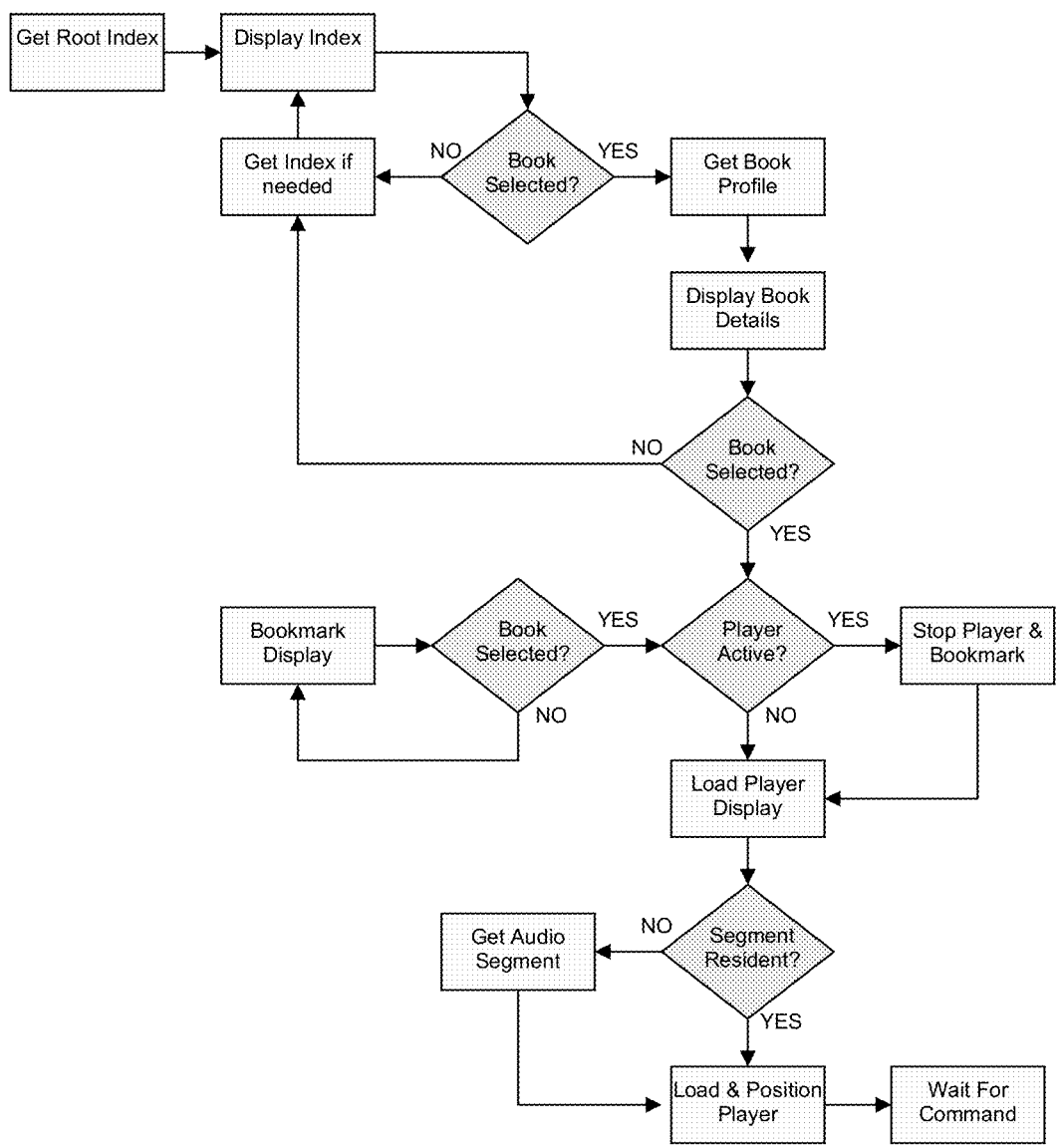
FIG. 19 is a flow diagram illustrating one embodiment of the general functional process.

Referring to FIGS. 17, 18, and 19, process flow overviews for using the software product are provided. More specifically, FIG. 17 shows an embodiment of a general process for using the software product, from start-up through various navigation steps and associated logic. A series of navigation buttons shown at the bottom of the diagram provide the user with the ability to navigate to various displays. FIG. 18 shows an embodiment of a process for using the standard control buttons. FIG. 19 shows an embodiment of a general process for loading the actual audio stream.

In summary, the software product provides the means to deliver large volume audio streams from a central library to the end user, to maintain bookmarks for each audio stream opened and being read regardless of the number of audio streams opened, to switch audio streams anywhere and anytime, to receive library based announcements and updates, to play spooled audio segments even when network service is unavailable, and to provide active management of network resources that balances load between the main library and all mirror sites on the network, and thus ensures fast, reliable service.

Of course, the above embodiments have been provided as examples only. It will be appreciated by those of ordinary skill in the art that various modifications, alternate configurations, and/or equivalents will be employed without departing from the spirit and scope of the invention. Accordingly, the scope of the invention is therefore intended to be limited solely by the scope of the appended claim

The invention claimed is:

1. A method of downloading digital content to be rendered, comprising:
    downloading from a network accessible server to a client device a list of content servers that are capable of serving requested digital content;
    tracking service level statistics for the content servers in the list of content servers;
    selecting a first content server to serve the requested digital content from the list of content servers in dependence upon the service level statistics;
    downloading a first segment of the requested digital content from the first content server to the client device for rendering;
    in the event of a degradation in service from the first content server, selecting a second content server to replace the first content server in serving the requested digital content from the list of content servers in dependence upon the service level statistics, wherein the server replacement is imperceptible to a user of the client device; and
    downloading a second segment of the requested digital content from the second content server to the client device for rendering;
    wherein the requested digital content is a digital media stream that includes the first and second segments, wherein the first content server is a first library server having the digital media stream stored thereon, and wherein the second content server is a second library server having a copy of the digital media stream stored thereon.

2. The method of claim 1, wherein the service level statistics include operational service levels.

3. The method of claim 1, wherein the service level statistics include data throughput levels.

4. The method of claim 1, wherein the service level statistics include connection metrics or disconnection metrics.

5. The method of claim 1, wherein the service level statistics are updated during the downloading of the first segment.

6. The method of claim 1, further comprising successively rendering the first and second segments on the client device without reconstructing the digital content, wherein the server replacement does not cause an interruption in the successive rendering of the first and second segments.

7. The method of claim 1, wherein the first content server consists of one or more server devices.

8. The method of claim 1, further comprising tracking service level statistics related to a connection established between the client device and the first content server.

9. The method of claim 1, wherein the requested digital content includes audio content, audio/video content, video content, text content, static image content, moving image content, user-entered content, advertising content, or a combination thereof.

10. A non-transitory computer-readable storage medium having stored thereon instructions which, when executed by a processor of a computing device, cause the computing device to:
   download from a network accessible server a list of content servers that are capable of serving requested digital content;
   track service level statistics for the content servers in the list of content servers;
   select a first content server to serve the requested digital content from the list of content servers in dependence upon the service level statistics;
   download a first segment of the requested digital content from the first content server for rendering;
   in the event of a degradation in service from the first content server, select a second content server to replace the first content server in serving the requested digital content from the list of content servers in dependence upon the service level statistics, wherein the server replacement is imperceptible to a user of the client device; and
   download a second segment of the requested digital content from the second content server for rendering;
   wherein the requested digital content is a digital media stream that includes the first and second segments, wherein the first content server is a first library server having the digital media stream stored thereon, and wherein the second content server is a second library server having a copy of the digital media stream stored thereon.

11. The computer-readable storage medium of claim 10, wherein the service level statistics include operational service levels.

12. The computer-readable storage medium of claim 10, wherein the service level statistics include data throughput levels.

13. The computer-readable storage medium of claim 10, wherein the service level statistics include connection metrics or disconnection metrics.

14. The computer-readable storage medium of claim 10, wherein the service level statistics are updated during the downloading of the first segment.

15. The computer-readable storage medium of claim 10, wherein the instructions, when executed by the processor, further cause the computing device to successively render the first and second segments on the client device without reconstructing the digital content, and wherein the server replacement does not cause an interruption in the successive rendering of the first and second segments.

16. The computer-readable storage medium of claim 10, wherein the first content server consists of one or more server devices.

17. The computer-readable storage medium of claim 10, wherein the instructions, when executed by the processor, further cause the computing device to track service level statistics related to a connection established between the client device and the first content server.

18. The computer-readable storage medium of claim 10, wherein the requested digital content includes audio content, audio/video content, video content, text content, static image content, moving image content, user-entered content, advertising content, or a combination thereof.

* * * * *